US009884556B1

(12) United States Patent
Palmer

(10) Patent No.: US 9,884,556 B1
(45) Date of Patent: *Feb. 6, 2018

(54) METHOD OF RENDERING DYNAMIC VEHICLE TELEMETRY ON A GRAPHICAL DISPLAY

(71) Applicant: Auto Meter Products, Inc., Sycamore, IL (US)

(72) Inventor: Brian Palmer, Orem, UT (US)

(73) Assignee: Auto Meter Products, Inc., Sycamore, IL (US)

(*) Notice: Subject to any disclaimer, the term of this patent is extended or adjusted under 35 U.S.C. 154(b) by 565 days.

This patent is subject to a terminal disclaimer.

(21) Appl. No.: 14/495,697

(22) Filed: Sep. 24, 2014

Related U.S. Application Data

(63) Continuation of application No. 12/271,633, filed on Nov. 14, 2008, now Pat. No. 8,881,038.

(60) Provisional application No. 61/003,672, filed on Nov. 19, 2007.

(51) Int. Cl.
*G06F 3/048* (2013.01)
*B60K 37/02* (2006.01)
*B60K 35/00* (2006.01)

(52) U.S. Cl.
CPC ............ *B60K 37/02* (2013.01); *B60K 35/00* (2013.01)

(58) Field of Classification Search
CPC . G06F 8/20; G06F 8/34; G06F 3/0481; G06F 3/04847; G06F 7/00; G06F 3/0485; G07C 5/008; G07C 5/00

See application file for complete search history.

(56) References Cited

U.S. PATENT DOCUMENTS

| 5,796,401 | A | 8/1998 | Winer |
| 6,795,760 | B2 | 9/2004 | Fuller |
| 7,116,216 | B2 | 10/2006 | Andreasen |
| 7,725,216 | B2 | 5/2010 | Kim |
| 7,786,851 | B2 | 8/2010 | Drew |
| 7,853,375 | B2 | 12/2010 | Tuff |
| 7,920,102 | B2 | 4/2011 | Breed |
| 7,928,837 | B2 | 4/2011 | Drew |

(Continued)

FOREIGN PATENT DOCUMENTS

EP 1513288 9/2005

OTHER PUBLICATIONS

CAN Tool Guide for 2008+ BMW 135/335/535/X5 (BMW_CAN_tool.pdf).

(Continued)

*Primary Examiner* — Rashawn Tillery
(74) *Attorney, Agent, or Firm* — Fitch, Even, Tabin & Flannery, LLP

(57) ABSTRACT

A vehicle telemetry data dashboard and display system includes display dashboards comprising dashboard objects that may be stored, organized, or accessed as a group, list or tree hierarchy. The dashboard objects may overlap, and have a display state such as visible or hidden, and properties such as shapes, colors, values, etc. The dashboard objects may be rendered on a graphical display device to display vehicle telemetry data obtained from a vehicle data port. Applying vehicle telemetry data to the dashboard objects may cause differing transformations to different properties of the dashboard objects, and transformation of a one property may also cause a transformation of another property.

22 Claims, 19 Drawing Sheets

(56) References Cited

U.S. PATENT DOCUMENTS

| | | | |
|---|---|---|---|
| 8,180,522 B2 | 5/2012 | Tuff | |
| 8,718,905 B2 | 5/2014 | Mosher | |
| 8,738,270 B2 | 5/2014 | Emberson | |
| 8,881,038 B1 * | 11/2014 | Palmer | G06T 11/20 715/764 |
| 2002/0178258 A1 | 11/2002 | Hushing, III et al. | |
| 2003/0058280 A1 | 3/2003 | Molinari | |
| 2003/0095146 A1 | 5/2003 | Roelofs | |
| 2006/0277498 A1 | 12/2006 | Mann | |
| 2006/0277499 A1 | 12/2006 | Britt | |
| 2008/0126352 A1 | 5/2008 | Case | |
| 2008/0126358 A1 | 5/2008 | Case | |
| 2008/0137860 A1 | 6/2008 | Silvernail | |
| 2008/0140281 A1 | 6/2008 | Morris | |
| 2008/0147268 A1 | 6/2008 | Fuller | |
| 2009/0184812 A1 | 7/2009 | Drew | |
| 2011/0258044 A1 | 10/2011 | Kargupta | |
| 2011/0313593 A1 | 12/2011 | Cohen | |
| 2012/0106342 A1 | 5/2012 | Sundararajan | |
| 2014/0207351 A1 | 7/2014 | Mosher | |

OTHER PUBLICATIONS

ISO 15765-4 Jan. 2005 (ISO_15765-4_2005.pdf).
ISO 9141 AN602 by John Bendel Apr. 1996 (iso9141_an602.pdf).
ISO 9141-2 Feb. 1994 (ISO9141-2_1994.pdf).
ISO/DIS 13400-1 Sep. 2010/Feb. 2011 (ISO_DIS_13400-1.pdf).
ISO/DIS 13400-2 Sep. 2010/Feb. 2011 (ISO_DIS_13400-2.pdf).
ISO/DIS 13400-3 Sep. 2010/Feb. 2011 (ISO_DIS_13400-3.pdf).
Commands for Host-Processed and Host Controlled Modems, Conexant, Apr. 5, 2001 (Hayes_command_reference.pdf.
Hypertext Transfer Protocol—HTTP/1.1, Network Working Group, 1999 (rfc2616.pdf).
STN1100 Family Reference and Programming Manual, OBD Solutions, probable date of Oct. 28, 2009 (stn1100_frpm.pdf).
The WebSocket Protocol, Internet Engineering Task Force, Dec. 2011 (rfc6455.pdf).
HTML Standard Aug. 22, 2013 (HTML_Standard.pdf).
Bendel, John, "Driver ICs for Automotice Diagnostic Communications Meet ISO 9141 Standards," TEMIC Semiconductors, Apr. 11, 1996 (iso9141_an602.pdf).
Juice Box Stage 4 PnP—135/335/535 Installation Guide—Jun. 20, 2012 (JB4PnP.pdf).
KWP 2000/14230-1 Oct. 1997 (14230-1s.pdf).
KWP 2000/14230-2 Apr. 1997 (14230-2s.pdf).
KWP 2000/14230-3 Feb. 2000 (14230-3s.pdf).
SAE J1850 Jun. 2006 (saej1850v004.pdf).
SAE J1962 Apr. 2002 (saej1962v003.pdf).
SAE J1978 Apr. 2002 (saej1978v003.pdf).
SAE J1979 May 2007 (saej1979v003.pdf).
SAE J2178-1 Jul. 2004 (saej2178-1v003.pdf).
SAE J2178-2 Jul. 2004 (saej2178-2v003.pdf).
SAE J2178-3 Jul. 2004 (saej2178-3v004.pdf).
SAE J2178-4 Jul. 2004 (saej2178-4v003.pdf).
SAE J2190 Jun. 1993 (saej2190v001.pdf).
SAE J2534-1 Dec. 2004 (saej2534-1v002.pdf).
SAE J2534-2 Mar. 2006 (saej2534-2v001.pdf).

* cited by examiner

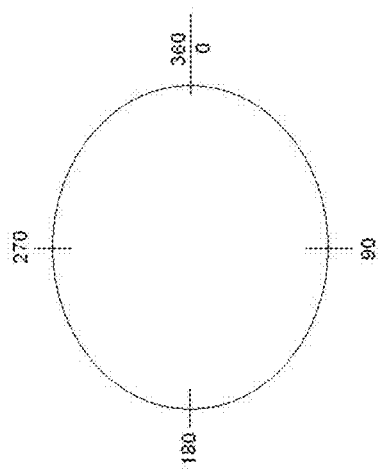
FIGURE 6
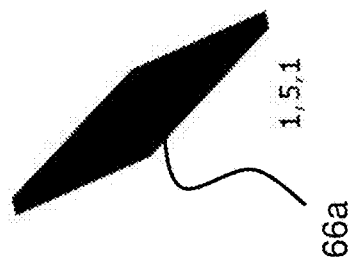
66a
1,5,1
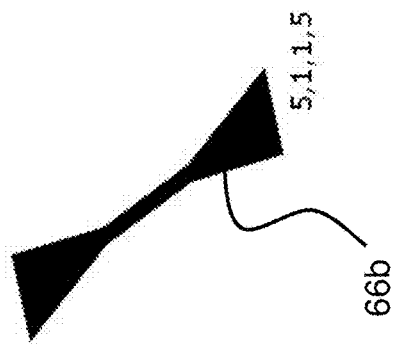
66b
5,1,1,5
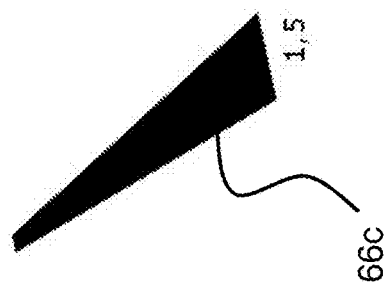
66c
1,5
FIGURE 8

Line

Ellipse

Rectangle

Rounded Rectangle

Arc

Polygon

Bezier Curve

Picture

Tick Marks

Needle

Path

Pie Wedge

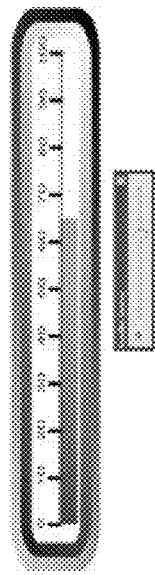
FIGURE 15A
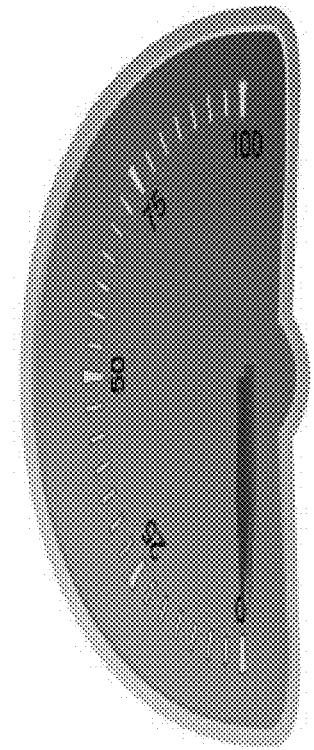
FIGURE 15B
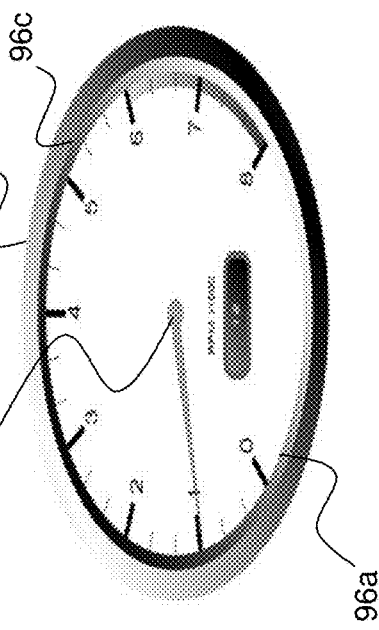
FIGURE 15C
FIGURE 15D

METHOD OF RENDERING DYNAMIC VEHICLE TELEMETRY ON A GRAPHICAL DISPLAY

CROSS-REFERENCE TO RELATED APPLICATIONS

This application claims priority based on U.S. patent application Ser. No. 12/271,633 filed Nov. 14, 2008 and titled "Method of Rendering Dynamic Vehicle Telemetry on a Graphical Display" and based on U.S. Provisional Patent Application Ser. No. 61/003,672 filed Nov. 19, 2007 and titled "Method of rendering dynamic vehicle telemetry on a graphical display," the disclosures of both of which are incorporated herein by this reference.

BACKGROUND

This application relates generally to a method for rendering dynamic vehicle telemetry on a graphical display, such as a computer monitor, and in particular to a method of providing a customizable system for a user to generate specific preferred dials and graphs for display.

Since 1996, every passenger car and light-duty truck sold in the United States has had a computer diagnostic port, called an OBD-II port or an SAE-J1962 port. This diagnostic port permits a mechanic or other user to connect to the vehicle and retrieve vehicle telemetry, that is, data about the vehicle, including engine, fuel system, brake system, and other data. Software has been developed to permit mechanics and automobile enthusiasts to develop graphical programs for displaying the telemetry data on a computer display.

In the past, these software systems have employed a variety of ways to display dials and graphs. Typically, a dial was drawn in a box, and the box displayed on the computer display. A needle was overlaid on the dial, and movement of the needle across the dial used to show data magnitude. If additional dials were to be displayed, additional boxes and dials, often of various sizes, were drawn. Users frequently wanted the dials to be arranged in specific patterns, and if that put the dials close together, the boxes often needed to be overlaid, often creating issues with box transparency and rapid rendering.

Rather than draw a plurality of boxes each having one dial, other systems used a single image having several dials in a particular arrangement. Needles were imposed over the image, one over each dial to show the data magnitude indicated by that dial. Unfortunately, the result was a static display that could not be adjusted for different user preferences without essentially starting with a new first-level image. This limited the flexibility of the system for users.

In other prior systems, a user was permitted to make certain dynamic changes to the viewable dashboard. However, such a system was typically designed for proper display only on a monitor having a specific resolution. If rendered on a monitor with a different resolution, the dashboard display would be distorted or incomplete. Therefore, developing a dashboard generation and vehicle telemetry rendering system having flexibility of design and display would be very useful for users.

SUMMARY

The present method renders dynamic vehicle telemetry data on a graphical display, such as a computer monitor, hand-held device or even an image file. The method permits the user to design specific, flexible dial and graph displays, with a variety of needle styles and types. The dials may be placed essentially at any position in the display, even seamlessly overlapping other dials. The method adjusts for different monitor resolutions because the dials are scalable.

The method uses a library of objects, such as scalable dials and needles and other shapes, as a foundation for building a dashboard. The objects may be positioned based on an arbitrary coordinate system. Each object has certain properties that are adjusted to affect the way the dashboard is rendered on the computer monitor. The objects are typically stored on an object tree, but in some embodiments may be stored in a list.

In one embodiment, the dashboard designer opens a template editor application and creates a first layer for the graphical object display. The designer adds additional objects to the display, and the objects are loaded into the object tree as child objects to the first layer. The graphical objects are organized so that certain graphical objects are children or grandchildren or other descendants of other objects.

The designer may then create a second layer for graphical object display, again adding objects in the object tree as child objects to the second layer. These objects are again organized so that certain graphical objects are children or grandchildren or other descendants of other graphical objects in the object tree. The designer may thus create additional layers with graphical objects in the object tree as child objects, grandchild objects, or other descendant objects. Each layer object employs a render cache. In effect, in some embodiments each layer acts as an object itself, an object that allows grouping of objects together in the same rendered cache. However, in other embodiments, the caching points may be automatically determined (instead of using layer objects) and in other embodiments, the objects are listed rather than loaded into an object tree.

The graphical display template takes data from a data source, such as the vehicle diagnostic or OBD-II port, and displays vehicle telemetry data using the dials and gauges and needles and other objects included in the template. In other words, the telemetry data is taken from the vehicle or other data source. The rendering program traverses the object tree (or the object list) to apply data values to the graphical objects configured to represent those values. The data is rendered on the monitor for each layer. Each rendering is cached on a layer by layer basis, or in some embodiments, on an object by object basis.

For subsequent renderings of the dashboard, data values may, or may not, be constantly changing. If data for a given object has changed, the layer is subsequently rendered using the changed (dynamic) data. If no data in any given layer has changed, the graphical objects that represent those static data values are subsequently rendered for that layer using the cache associated with that layer (or object). As a result, each rendering generates a dashboard image showing the most recent data from the vehicle (or other data store).

According to the present method, some objects may be correlated with a condition or state to produce dynamic renderings. For instance, a bar needle used to display a tachometer reading may display a gradient of different colors based on the revolutions per minute. Similarly, the background of a gauge might change color or display a different style or texture when certain readings are to be displayed.

BRIEF DESCRIPTION OF THE DRAWINGS

Other features and advantages of the present method will be apparent from the following Detailed Description taken in conjunction with the accompanying Drawings, in which:

FIG. 6 is an exemplary chart depicting an angle measurement system used in one embodiment of the present method;

FIG. 8 depicts sample line objects constructed according to one embodiment of the present method;

FIG. 15A depicts a sample fill gauge constructed according to one embodiment of the present method;

FIG. 15B depicts a sample fill gauge-bar constructed according to one embodiment of the present method;

FIG. 15C depicts a sample ellipse gauge constructed according to one embodiment of the present method;

FIG. 15D depicts a sample path gauge constructed according to one embodiment of the present method;

DETAILED DESCRIPTION

According to the present method, a system is provided to prepare standard and custom dashboards for displaying data collected from a diagnostic port, such as an automobile's ODB-II port, to a user. The present method may also be used to display data from other sources, such as GPS devices, accelerometers, flight recording devices, and other mechanical and electro-mechanical devices. For purposes of simplicity, the present method will be described in the context of the currently existing automobile ODB-II port.

Figure 1:
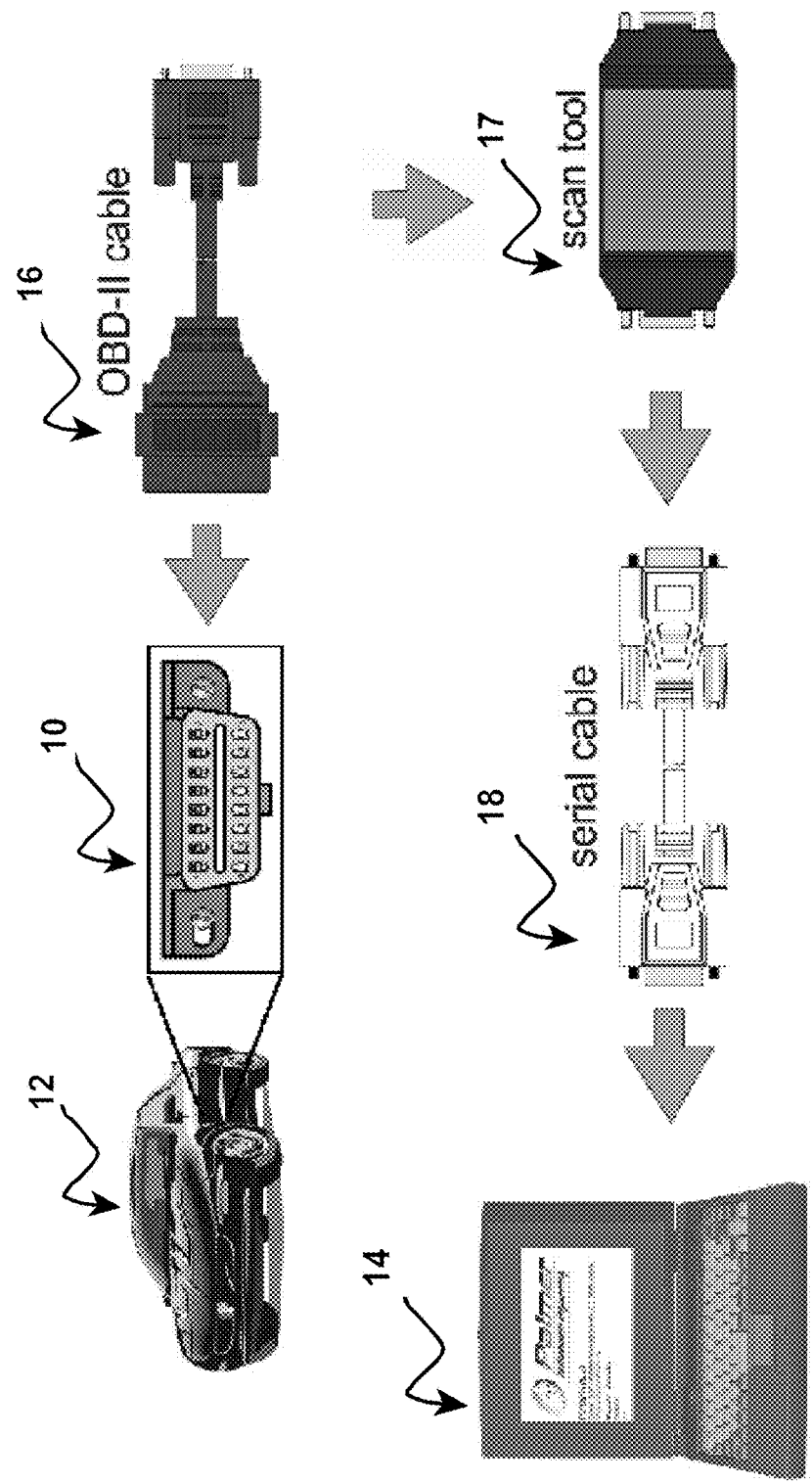
FIG. 1 depicts a typical connection between a computer and an automobile by which data is passed to the computer for use by the present method.

As depicted in FIG. 1, in a typical automobile ODB-II port environment, the diagnostic port 10 of a vehicle 12 such as an automobile is attached to a computer 14, such as a laptop computer, through an ODB-II interface cable 16, a scan tool 17, and a serial cable 18 or another series of cables and connectors. Upon doing so, a user is able to upload vehicle telemetry data to the computer 14. This telemetry data may then be displayed on a monitor or hand-held device. The present method permits development and customization of the display of data.

Figure 2:
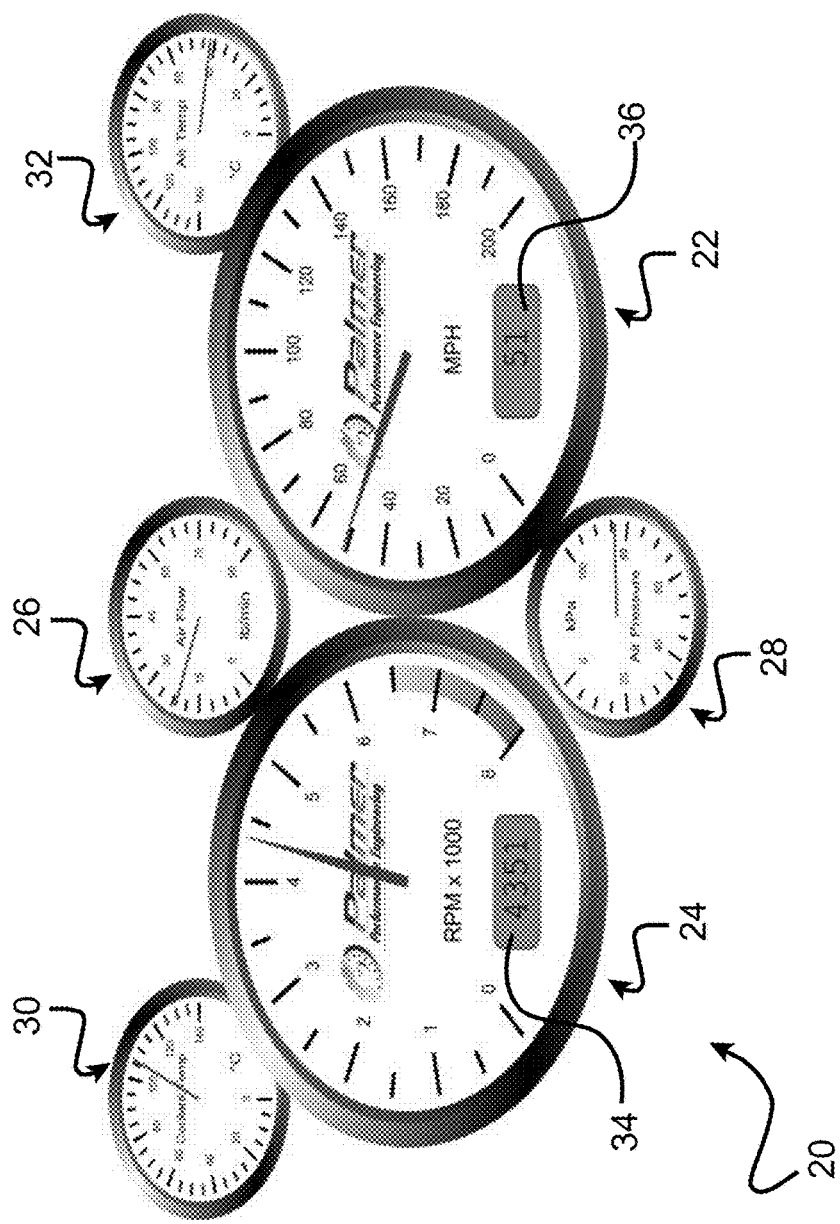
FIG. 2 depicts a sample dashboard display according to one embodiment of the present method.

As depicted in FIG. 2, the vehicle telemetry may be displayed on a dashboard 20 having dials and gauges thereon. For example, one dial 22 may display vehicle speed, another dial 24 may act as a tachometer, a dial 26 may display air flow rate, a dial 28 may indicate air pressure, other dials 30 and 32 may display coolant temperature and air temperature, and numeric displays 34 and 36 speed or show fuel mileage or engine speed or ignition timing (spark) advance or other such information. The current method permits a user flexibility in creating dashboards, and even permits a user to create different dashboards for different purposes.

As depicted in FIG. 2, the dashboard 20 may comprise several different dials and gauges and graphs. In a typical embodiment of the method, one or more pre-set template dashboards 20 may be provided. These templates permit the user quickly to prepare a dashboard for use in viewing vehicle telemetry. However, according to the present method, the user may also develop personalized dashboards, either from an existing template or from scratch.

Figure 3:
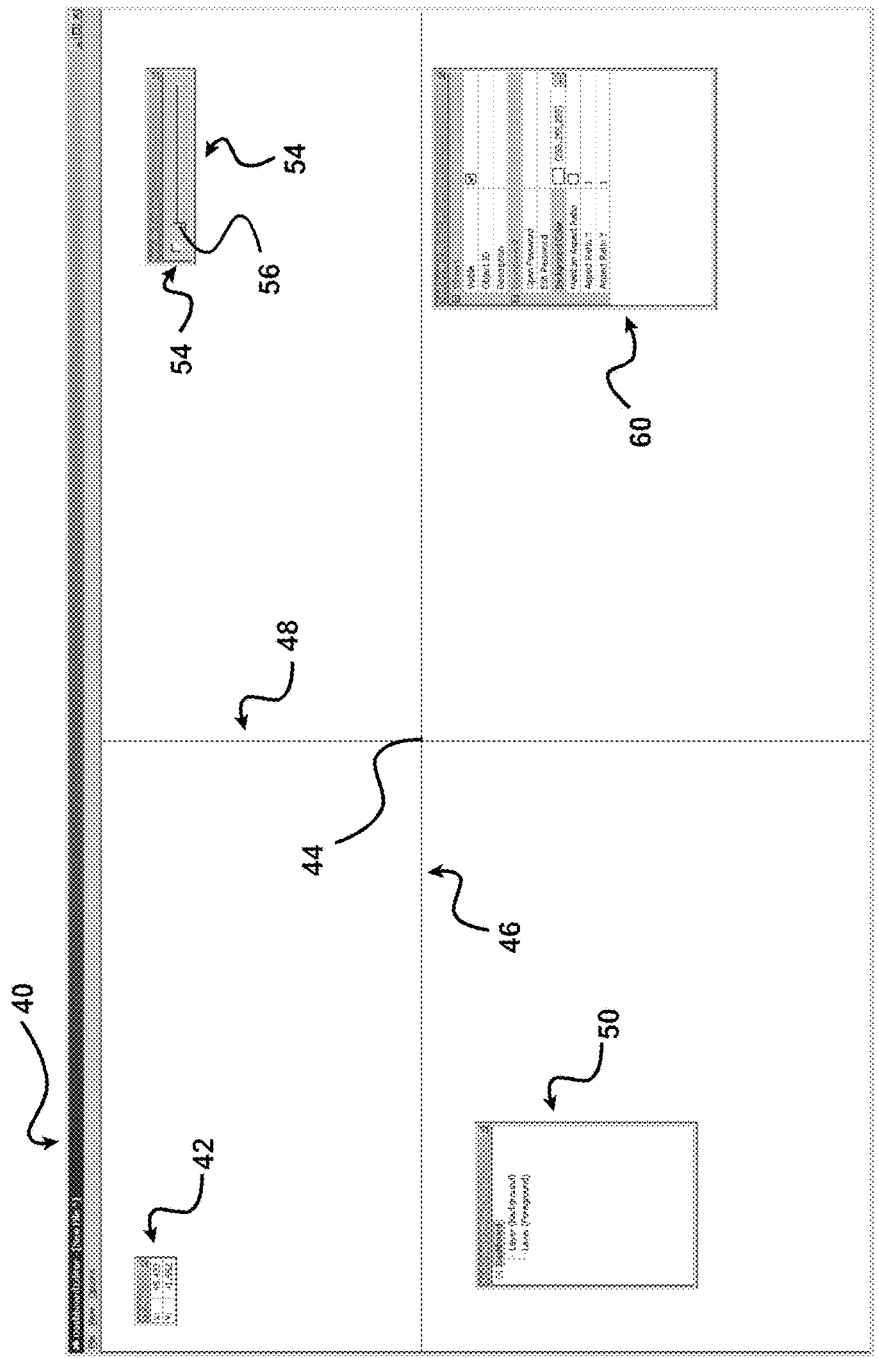
FIG. 3 depicts a dashboard editing window according to one embodiment of the present method.

As an example, and referring to FIG. 3, according to one embodiment of the method, a user working on the computer 14 (or other display device) opens a dashboard editor 40, revealing four open windows. The first, an X-Y position window 42 at the top left in FIG. 3, displays the X-Y coordinates of the computer cursor or, in the embodiment depicted in FIG. 3, the X-Y coordinates of cross-hairs 44, as two numbers based on the coordinate system employed. In the embodiment depicted, the coordinate system is based on 0-100 in both the vertical and horizontal axes, the numbers being arbitrary but representing equal divisions of the dashboard editor 40 in each direction (vertical and horizontal).

As the cross-hairs 44 move across the dashboard editor 40, the X coordinate in the X-Y position window 42 gives the horizontal position of the horizontal crosshair 46, and the Y coordinate gives the vertical position of the vertical crosshair 48. Thus the user may locate the coordinates on the display for placing an object.

A dashboard object view window 50 lists the objects that have been placed on the dashboard 20. In FIG. 3, the dashboard object window merely lists two empty layer objects, the background and foreground. A user edits an object by highlighting the object in this window. A + sign to the left of an object indicates that object contains one or more additional child objects. In the embodiment shown in FIG. 3, to view the child objects, the user clicks the + sign, the sign turns into a − sign and a list of the child objects opens.

A needle tester window 52 allows the user to see how gauges or dials 22 may operate when data is collected and displayed. Checking the box 54 to the left of the horizontal scroll bar activates the needle tester window. Dragging the arrow 56 back and forth along the scroll bar simulates data being applied to the gauges, and thus causes gauge needles to move.

A user may edit objects on the dashboard object view window 50 using a dashboard object properties window 60. The user may edit the selected object by changing the properties displayed in that window. Thus, the user may customize the layout of the dashboard 20 to accommodate functional and personal needs, wants, and styles. The user may add and delete objects, change locations on the dashboard, and even add images to the dashboard.

Figure 4:
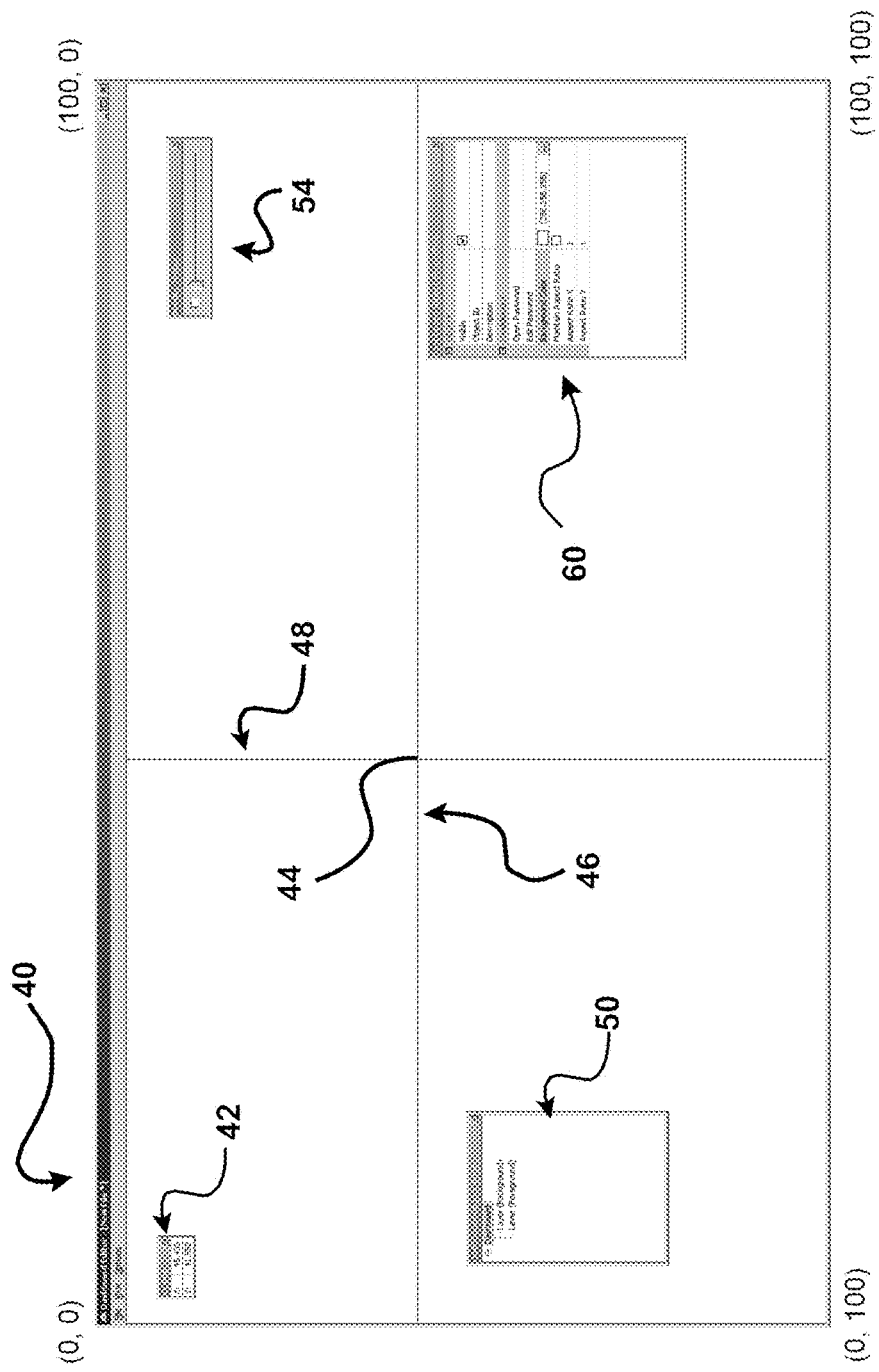
FIG. 4 depicts a coordinate system for the dashboard editing window of FIG. 3.

To create a new dashboard 20, the user typically needs to understand the coordinate system. In an exemplary embodiment, all coordinates correspond to the coordinate plane depicted in FIG. 4, with (0,0) in the upper left hand corner, (100,0) in the upper right corner, (0,100) in the lower left corner, and (100,100) in the lower right corner of the dashboard editor 40. The X position is the first value in the ordered pair, and the Y position is the second. In this embodiment, these values represent the percentage across the display the position is, increasing in value from left to right for X and from top to bottom for Y.

For example, the upper right corner position of (100,0) means the upper right corner of the dashboard editor 40 is 100% across to the right and 0% down. The coordinates are set to percentage of the window so that when the application is resized, the positioning and values of the objects remains the same. As a result, in this coordinate system, the center of the dashboard editor 40 will be (50,50), meaning halfway across and halfway down. Placing the crosshairs 44 on a specific point on the dashboard editor, causes the X-Y coordinates for that point to be displayed in the XY position window 42.

The user enters coordinates for each object (such as a gauge or dial) in the dashboard object properties window 60. For each object, the center point is entered with the X coordinate listed first, then a semicolon, then the Y coordinate. Thus, to place an object in the center of the dashboard 20, the user enters 50;50 for that object. To set other values, such as size or control points for a curve or multiple points for a polygon, the user enters the desired coordinates across and down the display the object is to span.

Figure 5:
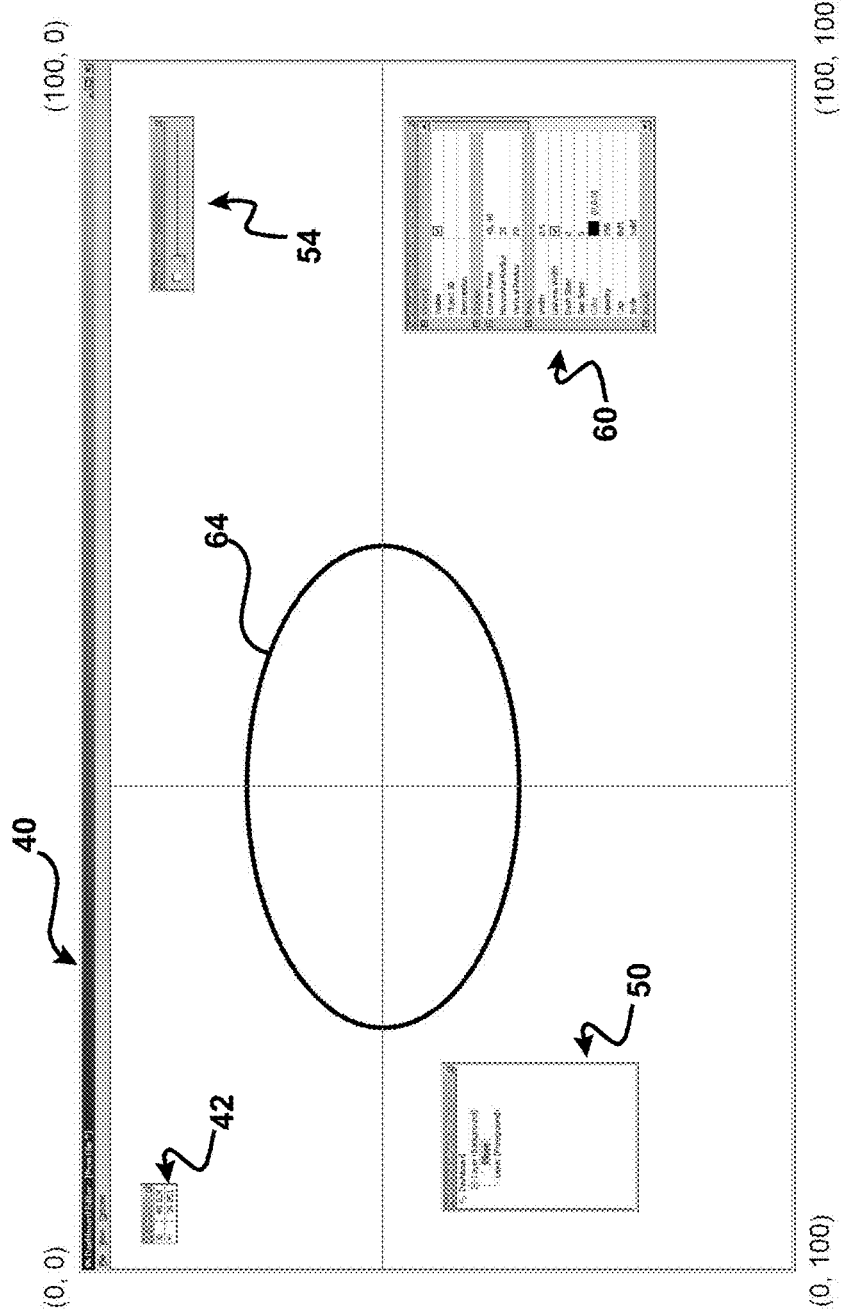
FIG. 5 depicts construction of an ellipse using the dashboard editing window of FIG. 3.

For example, for embodiments of the method based on this coordinate system, when building an ellipse 64, setting the horizontal radius and vertical radius to 20 will span the ellipse 20% or ⅕ of the way across the display in each direction (up, down, right, and left). Setting the center point for this ellipse as 40;40 will position the object 40% to the right and 40% down from the upper left corner (which coordinates are at 0;0). The resulting ellipse will appear as depicted in FIG. 5. Because the shape of the ellipse is based on the size and shape of the dashboard editor 40, if the display is resized (or a different resolution monitor used), the ellipse will be similarly resized.

In this embodiment, angles are measured in degrees. An angle of 0 is in the direction of the positive X-axis, that is, to the right in FIG. 6. An angle of 90 degrees is in the direction of the positive Y-axis, that is, to the bottom in FIG. 6. Angles increase in the direction from the positive X-axis toward the positive Y-axis. This means angles increase in a clockwise direction.

In operation, if an object (such as a circular needle or wedge) has a property representing an angle "sweep," such as that of an arc or a pie wedge, the sweep refers to the magnitude of the angle. For example, if an arc is to be ¼ of the way around the ellipse 64, the user enters a sweep of 90 degrees. For an arc to be ¾ of the way around, the user enters a sweep of 270. Hence, to create an object having angular properties, the user merely indicates a starting angle and a sweep angle. In other words, the user might indicate a start angle of 180 with a sweep of 90, resulting in a object that sweeps from angle 180 to angle 270.

Figure 7A:
FIG. 7A depicts a line object used in one embodiment of the present method.
Figure 7B:
FIG. 7B depicts an ellipse object used in one embodiment of the present method.
Figure 7C:
FIG. 7C depicts a rectangle object used in one embodiment of the present method.
Figure 7D:
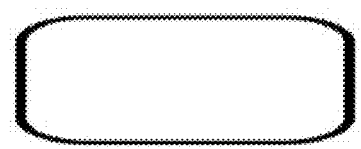
FIG. 7D depicts a rounded corner rectangle object used in one embodiment of the present method.
Figure 7E:
FIG. 7E depicts an arc used in one embodiment of the present method.
Figure 7F:
FIG. 7F depicts a polygon object used in one embodiment of the present method.
Figure 7G:
FIG. 7G depicts a bezier curve object used in one embodiment of the present method.
Figure 7H:
FIG. 7H depicts a picture object used in one embodiment of the present method.
Figure 7I:
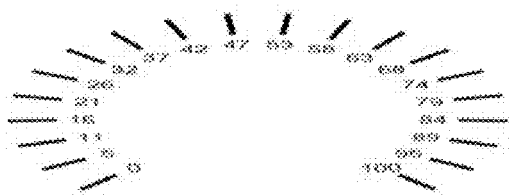
FIG. 7I depicts a tick marks object used in one embodiment of the present method.
Figure 7J:
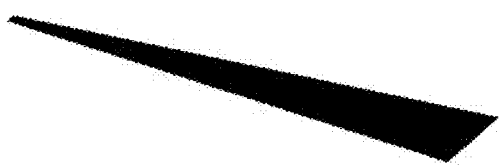
FIG. 7J depicts a needle used in one embodiment of the present method.
Figure 7K:
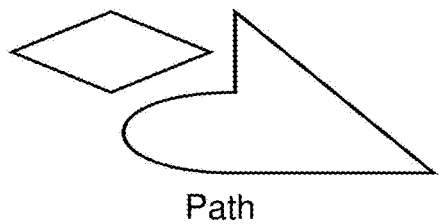
FIG. 7K depicts a path object used in one embodiment of the present method.
Figure 7L:
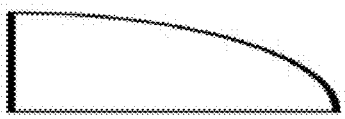
FIG. 7L depicts a pie wedge object used in one embodiment of the present method.

In this embodiment, a variety of objects may be provided with the system. Examples of such objects are depicted in FIGS. 7A through 7L. Referring to FIG. 7A, a line may be placed anywhere in the dashboard 20, but may be especially useful for needles. The line may be edited according to start point, end point, and width. The start point represents where the line should start. To select a start point, the user may either enter in the coordinates or click a box that appears when entering coordinates and use the crosshairs 44 to set the start point. The end point may be selected in a similar fashion.

Width controls the thickness of the line. The user may change the thickness of a line at any given point by entering a width list in the line width section of the dashboard object properties window 60. For example, to create the line 66a depicted on the left in FIG. 8, the user enters 1,5,1; the first width value is at the start point; the last width value is at the end point. All other values in between are divided evenly along the line. Thus, the middle line 66b of FIG. 8 has the values of 5,1,1,5, so that line starts with a width of five, reduces to one in the first third of the line (because four values parse the line into three parts), stays at one for a third, and expands to five in the last third. Similarly, as depicted on the right line 66c of FIG. 8, the values 1,5 will generate a line with a width of five at one end that evenly tapers to a width of one at the other end. Customized dashed lines may be created by entering dash lengths and gap lengths.

Other pre-loaded objects may include ellipse, rectangle, rounded rectangle, arc, polygon, bezier curve, picture, tick marks, text, needle, path, and pie wedge. Ellipses (FIG. 7B) form a good general shape for a gauge or any circular shape for the dashboard 20. Like many other objects, ellipses use a brush and pen for filling and outlining the shape, respectively. Multiple ellipses around a gauge may be configured to create three-dimensional look to the gauge.

The ellipse typically has properties with three values, center point, horizontal radius, and vertical radius. The center point property represents the location of the center of the ellipse. A user selects a center point by entering the coordinates or by clicking a box, or any of the other computer desktop navigation methods available.

The horizontal radius is the horizontal length of the radius in percentage of the display. The radius is the length from the center point to the edge of the ellipse. Therefore, the diameter of the entire ellipse is twice the length of the radius (from one edge to the center point to the other edge). Thus, to set an ellipse to be half the length of the display, the horizontal radius is set to 25, meaning from one edge of the ellipse to the center is 25%, or ¼, of the display. Vertical radius is the vertical length of the radius in percentage of the display, and is set in a fashion similar to that of horizontal radius.

Rectangles (FIG. 7C) are often used to outline text, to form gauge backgrounds, as needles, as the background for a bar gauge, and other uses. Like many other objects, rectangles use a brush and pen. Rectangles are edited in the properties window with two properties, center point and size.

Center point for a rectangle represents the location of the center of the rectangle. A user selects a center point by entering the coordinates or by clicking a box, or any of the other computer desktop navigation methods available. Size determines the height and width of the rectangle. Values may be entered into a size box, the first value represents the width, followed by the height, separated by a semicolon. These values determine the size and location of the rectangle on the dashboard.

Rounded rectangles (FIG. 7D) are rectangles with rounded corners. The rounded edges may be modified to become more or less round using a radius function. Rounded rectangles include an additional property over rectangles, that of radius of the corners. A radius of 0 means the corners are square. The greater the radius, the more rounded the corners will be.

An arc (FIG. 7E) is useful for adding color bands to a gauge. Arcs use a brush and pen. Arcs have properties with six different values, center point, horizontal radius, vertical radius, arc angle, arc sweep, and arc width.

Center point represents the location of the center of the arc. The center point for an arc is the point from which the radii will be calculated. A user selects a center point by entering in the coordinates or by clicking a box, or any of the other computer desktop navigation methods available.

Horizontal radius refers to the horizontal (X-axis) distance from the center point to the arc, expressed as a percentage of the display. The radius is the length from the center point to the arc. Therefore, the diameter of the entire arc is twice the length of the radius (from one edge to the center point to the other edge). Thus, for an arc to be half the length of the display, the user sets the horizontal radius to 25, so that from one edge of the arc to the center point is 25%, or ¼, of the display. Vertical radius is the vertical (Y-axis) length of the radius in percentage of the display, and is set in a fashion similar to that of horizontal radius.

Arc angle represents the starting point for the arc. Arc angle is set using degrees along the circle, as previously described. Thus, for example, for the arc to start at the leftmost point, the user enters 180 for the arc angle.

Arc sweep refers to the arcuate length of the arc. Ninety degrees is one-quarter of an ellipse, so to form an arc that is ½ of an ellipse, the user enters 180 degrees. For an arc of ⅛ of an ellipse, the user enters 45 degrees.

Arc width adjusts the width of the arc. Arc width is measured from the line of the ellipse that would have been created using the radii and center points entered by the user. Half of the width is distributed to each side of that ellipse line.

The polygon (FIG. 7F) forms shapes without rounded edges using the coordinate system. Like many other objects, polygons use a brush and pen. The polygon properties are based on points, that is, coordinates entered by the user for the points of the polygon. The user enters points using a points dialog box or by tracing a path using the crosshairs 44. The polygon draws from the first point to the next, then after the last point, draws back to the first point. Changing a point involves highlighting the point and editing the X and Y coordinates for the point. Removing a point involves highlighting the point and clicking remove.

The polygon is typically a closed shape, so to draw an open polygon, that is, a polygon without a line connecting the last point back to the first, the user uses a path object. The path object creates shapes using combinations of straight lines and curves through the use of the coordinate system. Unlike a polygon object, the path can open and close several times to create open shapes, closed shapes, or a combination of open and closed shapes. Like many other objects, paths use a brush and pen.

The path object (FIG. 7K) uses a brush and pen. A user enters the path object coordinates or by clicking a box, or any of the other computer desktop navigation methods available. The path draws from each point sequentially down the list. Path object points may be edited and removed.

One embodiment of the invention has four types of path items. "Move To" moves the pen to the coordinate given. It does not draw a line from the last point to this point. "Line To" draws a line from the previous point on the list to a new point given. "Curve To" adds a curve stretching from the previous point on the list to the new point given. This path item utilizes two additional points to specify the shape of the curve. "Close Path" draws a line back to the starting point of the path. No coordinates are needed for this item. When the pen is moved again using the Move To path item, it will start a new path. When the Close Path item is added again, it will close to the last Move To coordinates.

Bezier curves (FIG. 7G) use a starting point, an end point, and two other reference points to shape the desired curve. Curves are fully customizable using 4 points. Curves use a brush and pen.

Curves are defined by four coordinates, start point, first control point, second control point, and end point. Start point represents where the curve starts, and is selected by entering the coordinates or by clicking a box, or any of the other computer desktop navigation methods available. First and second control points are not necessarily on the curve, but shape the curve as is known in the art. Control points are selected in the same way as the start point. The end point is the point where the curve ends, and is similarly selected.

The user may insert a picture or image (FIG. 7H) from a computer file into the dashboard 20. A picture object can be added to the dashboard to contain many picture formats, from a picture off of the web to a picture from a digital camera. A picture may be used as a background for a gauge, as a needle, or for any other element on a gauge.

Pictures have properties with four different values, center point, size, picture, and opacity. Center point represents the location of the center of the picture. A user selects a center point by entering in the coordinates or by clicking a box, or any of the other computer desktop navigation methods available.

Size determines the height and width of the picture. Values are entered inside a size box, the first value represents the height, followed by the height, separated by a semicolon. These values determine the size and location of the rectangle on the dashboard.

Picture is the actual picture or image file to be inserted into the dashboard 20. The picture is selected by accessing it on the computer file system, as is known in the art.

The picture may be partially or completely opaque. Opacity is based on a numeric system, such as using 255 as completely opaque. Thus, to make an object 50% translucent, the user sets opacity to about half of 255, or 128.

Tick marks (FIG. 7I) are often very useful in a gauge. Tick marks may be modified in different ways, and typically include two types, circular ticks, and straight ticks. Tick marks also contain a line object and a text object that both modify the tick marks and tick labels respectively. The line and text objects under the tick marks are modified the same way as other line or text objects except that the start point and end point for the line, as well as the position for the text, usually do not need to be modified. Tick marks typically includes the properties of type, tick count, skip tick list, show tick labels, label start range, label end range, label start rotation, and label end rotation.

Tick marks may circular for a circular gauge or straight for a bar gauge. The type selected indicates the properties that may be edited. For example, there is no need to modify a circular tick mark using properties of a straight ticks mark.

Tick count represents the number of ticks on the gauge. Skip tick list indicates which ticks are to be skipped; the skipped ticks are recorded in list form, separated by commas. The order number of the ticks (the first tick being 0), not the value, is recorded.

Show tick labels turns on or off the text labels. Label start range is the value for the first tick. Label end range is the value for the last tick. Once the start and end range for the labels are entered, the system typically automatically calculates the values for the rest of the ticks.

Figure 9:
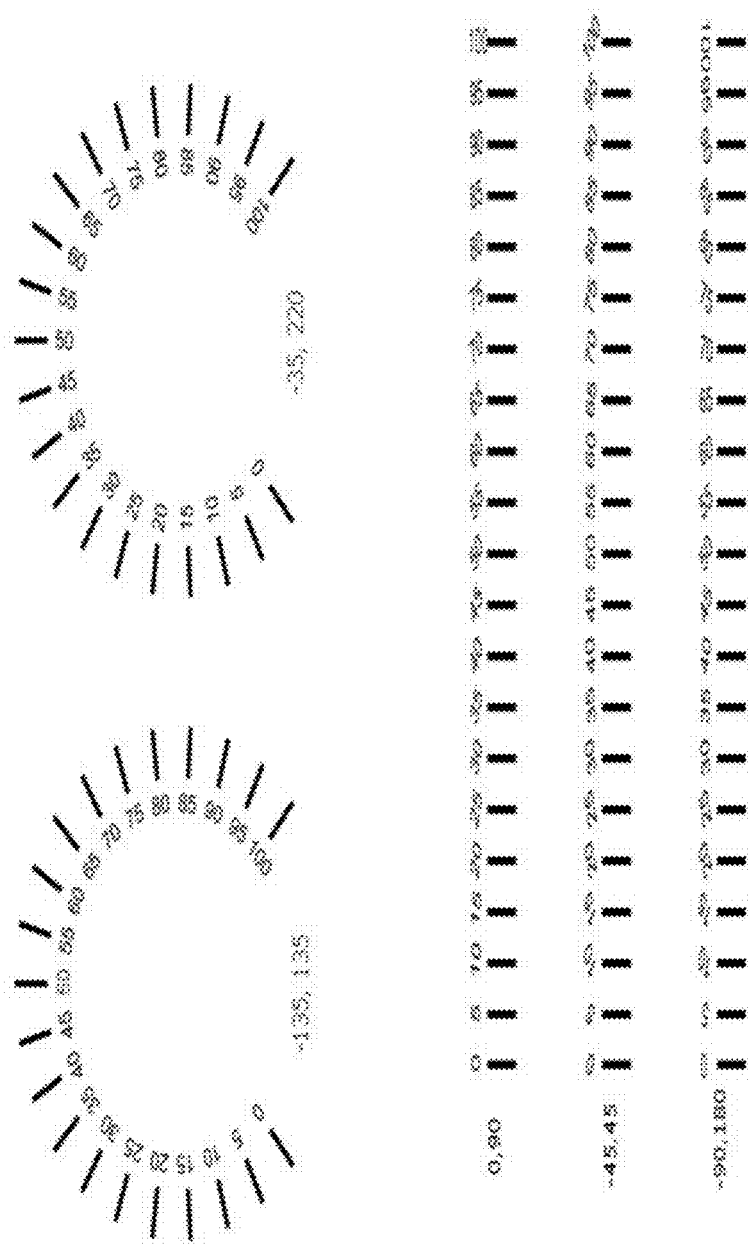
FIG. 9 depicts sample circular and straight tick marks objects constructed according to one embodiment of the present method.

Label start rotation defines the angular orientation of the ticks text labels. For tick labels that are completely vertical, the start and end rotation value is 0. To slant the ticks, the user enters the degrees the first tick label is to slant. Label end rotation is also entered as degrees. FIG. 9 depicts examples of straight and circular ticks with varying label start and end rotations. The first value listed represents the start rotation; the second value is the end rotation. Circular ticks include the properties of direction, center point, horizontal radius, vertical radius, angle, sweep, length, and label position. Direction specifies if the ticks and associated labels are inside or outside of the circle made by the center point and radii. Center point is the center point of the tick marks. Horizontal radius is the horizontal length from the center point to the edge of where the tick marks and labels start (if the direction mentioned above is specified outside) or end (if the direction specified is inside).

Vertical radius is the vertical length from the center point to the edge of where the tick marks and labels will start (if the direction mentioned above is specified outside) or end (if the direction specified is inside). Angle specifies where along the circle the tick marks start. Sweep is the sweep, or length around the circle, of the tick marks. Length adjusts the length of the tick mark lines. Label position specifies the position of the labels towards the inside or outside of the circle, in percentage of the radii specified. If the direction selected is inside, the labels move towards the center. If the direction is outside, the labels move away from the center.

Straight ticks include the properties of direction, start point, end point, length, and label position. Direction modifies the labels and tick marks to be on the first side or second side of the line made by the start point and end point. The start point is the coordinates where the ticks start, and the end point is the coordinates for where the ticks end. Length modifies the length of the tick mark lines. Label position modifies the location of the tick labels in relation to the invisible line drawn from the start point to the end point. Zero indicates that the labels are on the line, and the higher the position, the further away the labels are from the line.

The user may include text as a text string to label a gauge or dial, with a multiplier or by linking to an OBD-II value. Text strings also use a pen and brush. Typical text properties include position, horz justify, vert justify, format string, rotation angle, and use OBD-II value.

To position text, the user enters the coordinates for, or uses the cursor to locate, the reference point where the text is to be located. Horz justify places the text horizontally based on the position. Vert justify places the text vertically based on the position.

Format string customizes the format of the text, including customizing text when linked to an OBD-II value. A % f value type displays the precision of the value. For instance, if the selected value was intake manifold absolute pressure and showed "6.8," altering the formatting string to %.0f would change the value displayed to "7." If the value showed 61, by changing the format string to %.2f the number displayed might be 61.25.

The % s value type is used for text only. Title and Units text values use this type, and can be modified using the formatting string, for instance by adding letters or numbers before or after the title. For example, if the parameter for the gauge is SAE.RPM, using Engine % s changes the display to "Engine RPM"; if the gauge parameter is SAE.VSS (Vehicle Speed Sensor), using % s (MPH) changes the display to VSS (MPH).

Rotation angle is the angle of rotational display for the text. An angle of zero produces vertical text. The user enters the degrees of slant to slant the text.

The text may also be linked to display the OBD-II value. The OBD-II value property includes linking to a parameter (PID) such as SAE.RPM, or SAE.VSS. The value type displays information about the PID. Name (String)—displays the name of the PID (i.e. Engine RPM). Unit (String)—displays whatever unit the PID is in (i.e. MPH). Value (String)—shows the value of the parameter when the value to be displayed is text (i.e. on/off). Value (Number)—shows the value of the parameter when the value to be displayed is a number. Value Min (Number)—displays the lowest value the PID has been so far in the log. Value Max (Number)—displays the highest value the PID has been so far in the log. Value Average (Number)—displays the average of the PID's values so far in the log. The unit system may be switched to English or metric.

The font properties include face name, bold, italic, height, and width. Face name is the name of the font. Bold, italic, height (font size), and width (narrow, wide) may also be selected for text.

A needle object (FIG. 7J) is actually a container for whatever the needle is. A needle may be a line, a picture, or any other shape or combination of shapes. Once added to the dashboard, the needle is modified by adding the desired child object to make the needle. The child object becomes part of the needle container and will rotate around its center point or along the linear path of the needle. A needle tester may be included to test the needle.

Circular needles include the properties of center point, sweep, range start and range end. Center point reflects the coordinates for the point around which the needle container rotates. Sweep indicated the length of the needle's sweep in degrees. Range start and range end are the starting (usually zero) and ending values for the gauge.

Linear needles include the properties of type, start point, end point, range start, range end, and clip point. Typically, there are two types of linear needles, offset (a bar-gauge needle that runs from the start point to the end point) and clip (a needle that fills from the clip point). Start point and end point indicate the coordinates for the starting point and the ending point for the needle container. Range start and range end are the starting (usually zero) and ending values for the gauge. Clip point is for a fill gauge, and is the point from which the needle fills out to either the start point or the end point, depending on the needle objects configuration.

The needle container may also be linked to an OBD-II value. The OBD-II value property includes linking to a parameter (PID) such as SAE.RPM, or SAE.VSS. The value type displays information about the PID. Name (String)—displays the name of the PID (i.e. Engine RPM). Unit (String)—displays whatever unit the PID is in (i.e. MPH). Value (String)—shows the value of the parameter when the value to be displayed is text (i.e. on/off). Value (Number)—shows the value of the parameter when the value to be displayed is a number. Value Min (Number)—displays the lowest value the PID has been so far in the log. Value Max (Number)—displays the highest value the PID has been so far in the log. Value Average (Number)—displays the average of the PID's values so far in the log. The unit system may be switched to English or metric.

Pie wedge (FIG. 7L) is a modification that can take up any or all of an ellipse. Pie wedges use a brush and pen. Pie wedges include the five properties, center point, horizontal radius, vertical radius, wedge angle, and wedge sweep.

Center point represents the location of the center of the wedge. The center point for a wedge is the corner from which the radii will branch (see below). A user selects a center point by entering the coordinates or by clicking a box, or any of the other computer desktop navigation methods available.

Horizontal radius refers to the distance from the center point to the edge of the wedge (horizontally) in percentage of the display. Vertical radius refers to the distance from the center point to the edge of the arc (vertically) in percentage of the display. Wedge angle defines where the wedge starts. If the wedge start at the leftmost point, for example, the user enters 180 for the wedge angle. Wedge sweep refers to the length of the wedge. Ninety degrees is ¼ of an ellipse, so for a wedge that is ½ of an ellipse, the user enters 180.

Most objects may be customized using a pen and brush, and thus the properties window for those objects includes pen and brush property sets. The pen is the outline of the object and the brush is the fill. The brush and pen of the object are edited in the dashboard object properties window 60. The pen properties may include width, dash sizes, gap sizes, color, opacity, cap, and style. The user selects what properties to customize.

Width means the width of the pen in relation to the percentage of the window. For example, the default width may be 0.5, meaning 0.5% of the display size. To make the pen thicker, the user increases the width.

When the dash and gap sizes are set to 0, the pen will be a solid outline. To make the outline dashed, the user sets a dash size and a gap size. The higher dash size number, the longer the dash will be. Multiple dash sizes may be entered by separating each value with a comma. For a line to be dashed, the gap size must be greater than 0. The user enters the size of the gap desired between each dash. The user may also alter the width of the dash and gap sizes. For example, if the user wants a dash pattern of short, longer, and longest dashes, with the same gap sizes, the user might enter the values 1,5,10 in the dash size and 1,1,1 in the gap size.

The user may select the color of the pen by either entering the RGB color coordinates or selecting a color from a color box. Opacity is based on a numeric system, such as using 255 as completely opaque. Thus, to make an object 50% translucent, the user sets opacity to about half of 255, or 128.

Cap is the setting used to adjust for the finishing start and end points of the dashes. Depending on the embodiment, different styles might include round, square, and butt. The round and square settings add a round or square cap onto each end of the dashes, whereas the butt setting does not add any cap onto the ends of the dashes. To make the pen transparent, the user selects a transparent style. Typically, using transparency is preferred over setting the pen width to zero, as a transparent pen turns the pen off completely thereby speeding the rendering.

The brush properties may include color, opacity, style, gradient style, first gradient point, second gradient point, first gradient radius, second gradient radius, gradient color stops, hatch style, hatch color, hatch opacity, hatch scale, image pattern, image opacity, image scale, and image rotation. The user selects the color of the brush by entering the RGB color values or clicking on the right place in a color box. Again, opacity is based on a numeric system, such as using 255 as completely opaque. Thus, to make an object 50% translucent, the user sets opacity to about half of 255, or 128.

Style defines the fill used in an object. Solid fills the object with selected color using the selected opacity. Transparent does not fill the object.

Gradient style fills the object using a value scale. The user may select a linear or radial style. If the selected gradient style is radial, a radial gradient is a value scale that goes from one circle to another. A first gradient point acts as the center point for a first circle, at which point the gradient will start, and a second gradient point acts as the center point for a second circle. A first gradient radius represents the radius of the first circle and a second gradient radius represents the radius of the second circle. The color stops may be expressed as white at offset 0 to red at offset 50 to black at offset 100. Note that the gradient can be caused to appear to reflect over the second circle.

If the selected gradient is linear, the first gradient point is the starting point for the gradient, where the offset value will start. The second gradient point is then the ending point for the gradient, where the offset value will end. These offsets involve the gradient color stops.

Editing a gradient's color stops allows the user to change the colors of the gradient and transparency of each color, as well as where in the gradient the color will change. The user edits a gradient's color stops by entering or changing values for the color stops in a color stop window. The user may also remove a color stop using its corresponding button and move color stops up and down (although changing the order of the color stops is not necessary).

The color stops typically have offset, color and opacity values. Offset is the location of the color stop in relation to the gradient points. 0 is the offset for the first gradient point, and 100 is the offset for the last. 50 is the midpoint between the two points. The offset is the first value shown on the color stop.

The color selected will be the color the gradient is at the offset location entered. Color will appear in the color stop as an RGB values, such as the values (255, 0, 0) for red. Again, opacity is based on a numeric system, such as using 255 as completely opaque and half that value for half transparent at the offset.

Hatch fills the object with a pattern selected from the hatch style drop-down menu. Hatch values include scale, color, and opacity. The hatch scale value changes the size of the hatch, the larger the value, the larger the hatch.

The image setting uses an image from the computer to fill the object. Image pattern permits the user to select the image to be tiled to make the fill. Image opacity is, again, is based on a numeric system, such as using 255 as completely opaque. The image tile may be scaled larger or smaller by adjusting the scale value, and the rotation of the image tile may be set by entering the desired angle. These gradient concepts are explained in detail in the SVG specification that may presently be found at http://www.w3.org/Graphics/SVG/.

The dashboard 20 is the parent object of the layers to be added. Like other objects, a user edits the dashboard 20 in the dashboard object properties window 60. As with objects, the dashboard 20 has certain properties, including password and background color.

The user may set a password for opening the dashboard, using known techniques. The password may also apply when editing the dashboard, or editing may require a different password. Also, to select the background color for the dashboard, the user opens a dialog box and selects the desired color, and the RGB values are shown in the parenthesis next to the color box.

For faster rendering, the user divides the dashboard into layers. The first layer typically contains background objects and objects that do not dynamically change at runtime, such as gauge backgrounds and tick marks. The second layer typically contains objects that change, such as needles and text. Layers are cached, and so by grouping changing objects all on one layer and leave other objects in the background layer, the dashboard 20 renders faster as there is only one layer to draw each rendering.

A layer is a container that is a direct child object of the dashboard. Layers are used to group objects together. To add a layer, the user right-clicks the dashboard and selects Add Object, then Add Layer on the drop-down menu. Layers usually fall as child objects directly under the dashboard. Because each layer has a cache that may reach several megabytes in size, more efficient users use containers for grouping and organizing objects instead of layers.

Each layer groups its child objects, and so anything added under the layer may be moved, stretched, rotated, and made invisible as a group. Layers may have several properties, including offset x, offset y, rotation angle, rotation point, scale factor x, scale factor y, and clip to first child. These properties edit the layer and its child objects.

Offset X moves the layer horizontally. Offset Y moves the layer vertically. Both are changed by entering a value, positive to move right or down, negative to move left or up.

Figure 10A:
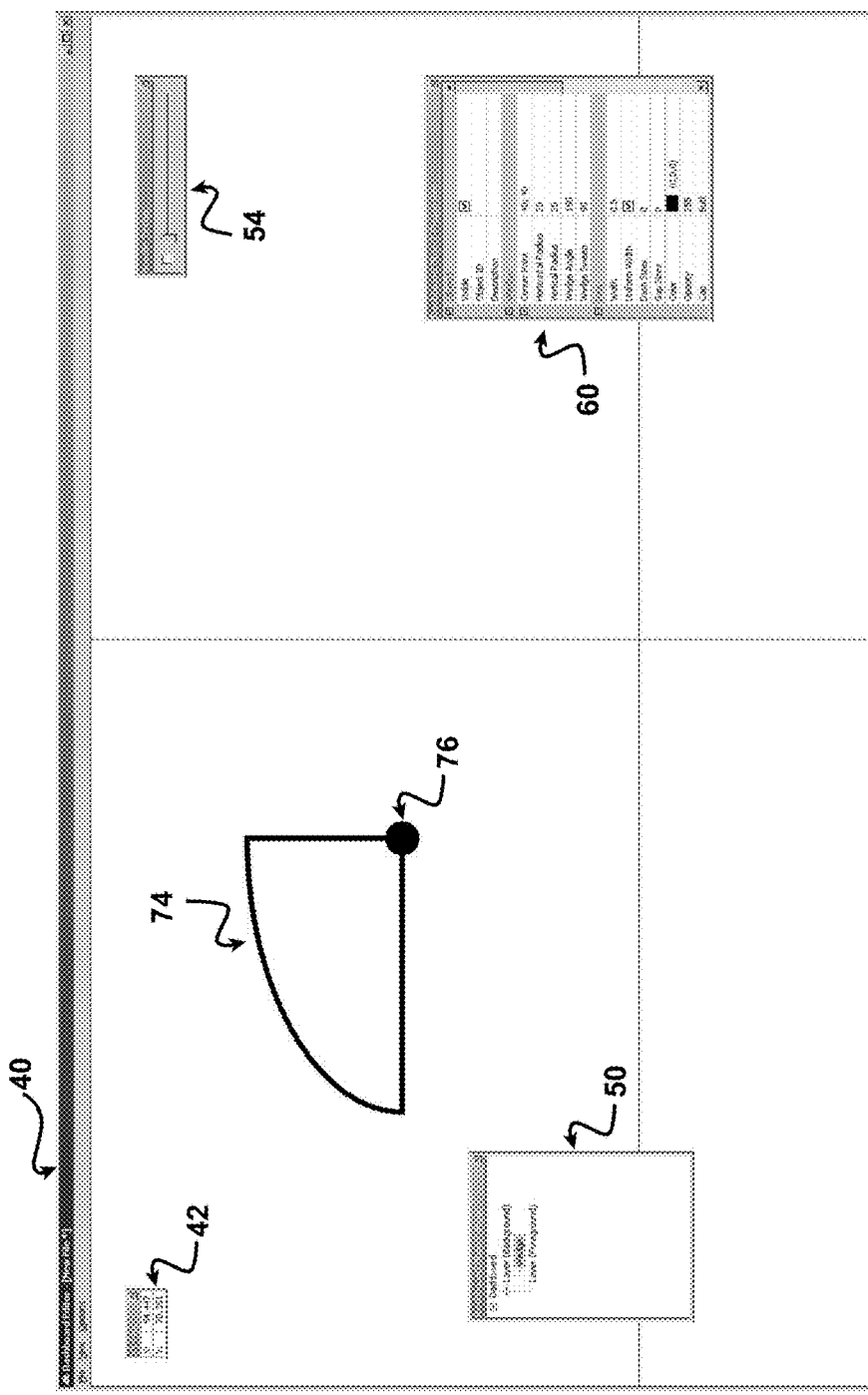
FIG. 10A depicts a dashboard editing window for editing a pie wedge in a layer according to one embodiment of the present method.
Figure 10B:
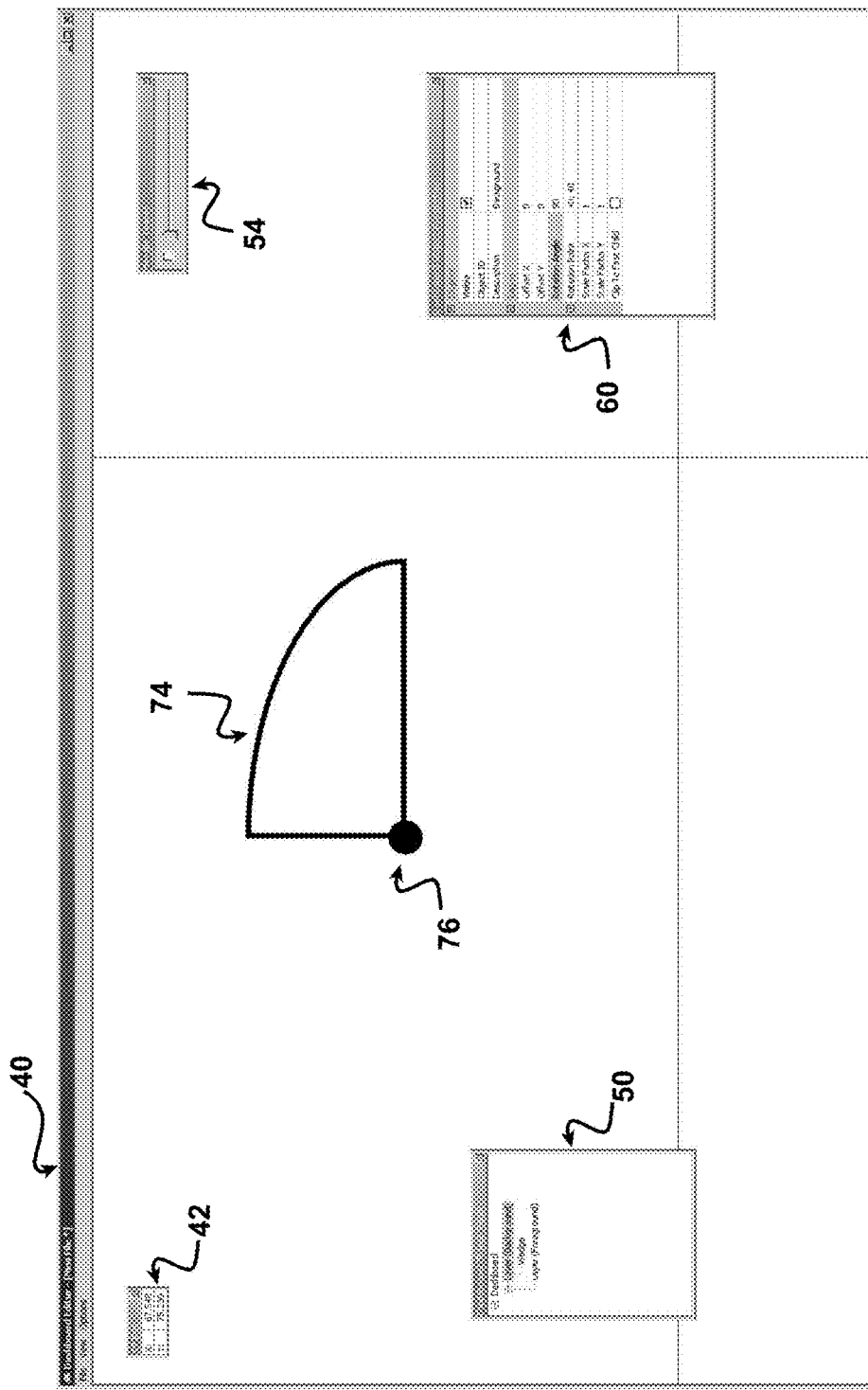
FIG. 10B depicts the dashboard editing window of FIG. 10A with the pie wedge rotated.

The rotation point is the point about which the layer is rotated. The user enters the rotation point coordinates or uses the cursor to mark the rotation point. The layer will be rotated clockwise around the rotation point the number of degrees entered as the rotation angle. For example, FIGS. 10A and 10B depict a layer with a pie wedge 74 having a rotation point 76. Entering a rotation of 90 degrees rotates the pie wedge from the position shown in FIG. 10A to the position shown in FIG. 10B.

Scale factor X horizontally stretches or shrinks a container (or layer) and its child objects. Scale factor Y vertically stretches or shrinks a container (or layer) and its child objects. Each is adjusted by entering a value. A scale of 2 doubles the width or height of the objects. A scale of 0.5 cuts the width or height in half. Clip to first child clips an object to the container's first child (the first object listed under the container). If the user selects the "clip to first child" property, all child objects after the first object will be clipped to the shape of the first child object. The first child object will not necessarily be rendered, but its shape acts as a mask for clipping.

Containers are useful for grouping the elements of a gauge together because several child objects may be placed into the same container. By adding child objects under a container, the user may make the entire group invisible, scale the container, rotate the container, and move the container by adjusting the containers properties. The user may thus transform all the objects in a container at once.

Containers have the same properties as layers, that is, offset x, offset y, rotation angle, rotation point, scale factor x, scale factor y, and clip to first child. Those properties are adjusted in the same fashion as for layers. That is, offset X moves the container horizontally. Offset Y moves the container vertically. The rotation point is the point about which the container is rotated, and rotation angle rotates the container clockwise. Scale factor X horizontally stretches or shrinks a container and its child objects. Scale factor Y vertically stretches or shrinks a container and its child objects. Clip to first child clips an object to the container's first child (the first object listed under the container). Clipping permits interesting effects, particularly if using it with a needle container, as discussed with reference to clipping.

Figure 11:
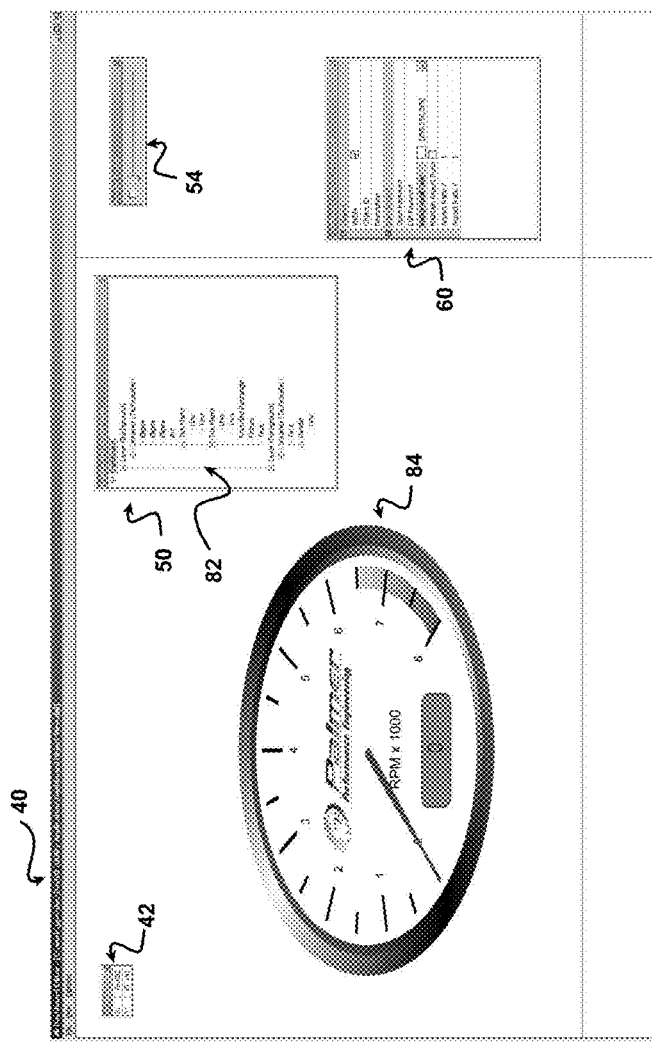
FIG. 11 depicts construction of a sample gauge according to one embodiment of the present method.

As depicted in FIG. 11, the dashboard object view window 50 holds a master list 82 of dashboard objects. The user selects an object to edit from the master list. The user adds or deletes objects from the master list as well as grouping objects into layers and containers and re-ordering objects in the list. To navigate to the object, the user clicks on the + sign, thereby revealing objects that are children of the object clicked.

In some embodiments, text color as shown in the master list 82 identifies features of the object, such as visibility. For instance, in one embodiment, a blue object means clipping is enabled for that object. A green object means the object is a child to which the object is clipped. When red, the object's visibility has been disabled in the dashboard object properties window 50. The result of editing on the dashboard object view window 50 is a gauge 84.

Clipping can be used to shape a gauge, hide objects outside of the gauge, or create special effects with a needle. Clipping hides the objects outside of the first child. Using clipping, the user may make a fill gauge, which is essentially a rotating wedge in a needle container.

Figure 12A:
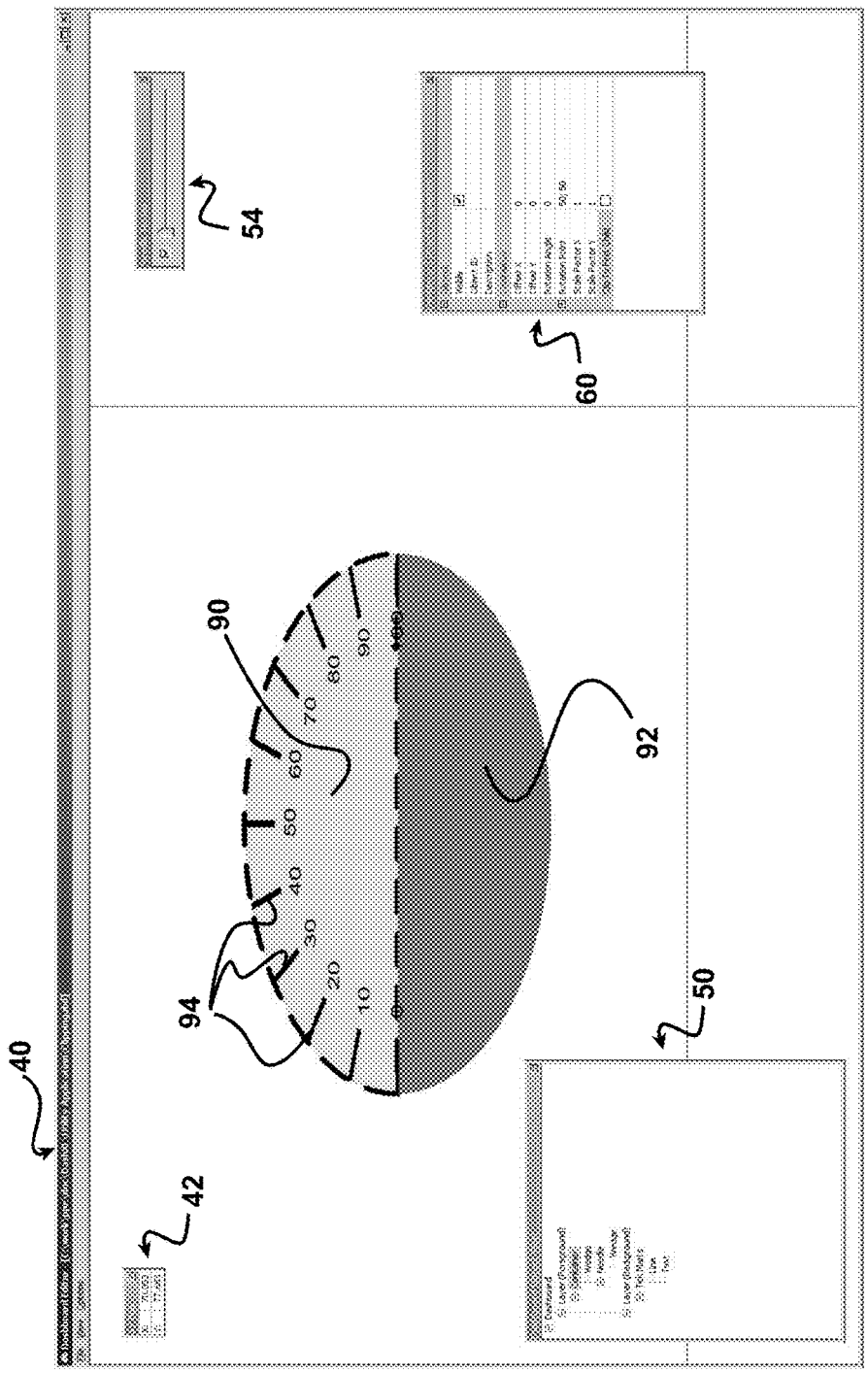
FIG. 12A depicts a step in the construction of a sample wedge gauge according to one embodiment of the present method.

For example, FIG. 12A depicts a dashboard editor 40 with a sample gauge 88 that has been formed using the dashboard object properties window 60. A dashboard object view window 50 lists the parts of the gauge 88, in this example including a foreground layer with a first wedge 90 and a needle that is formed using a second wedge 92. A background layer includes tick marks 94 formed from lines and text.

Figure 12B:
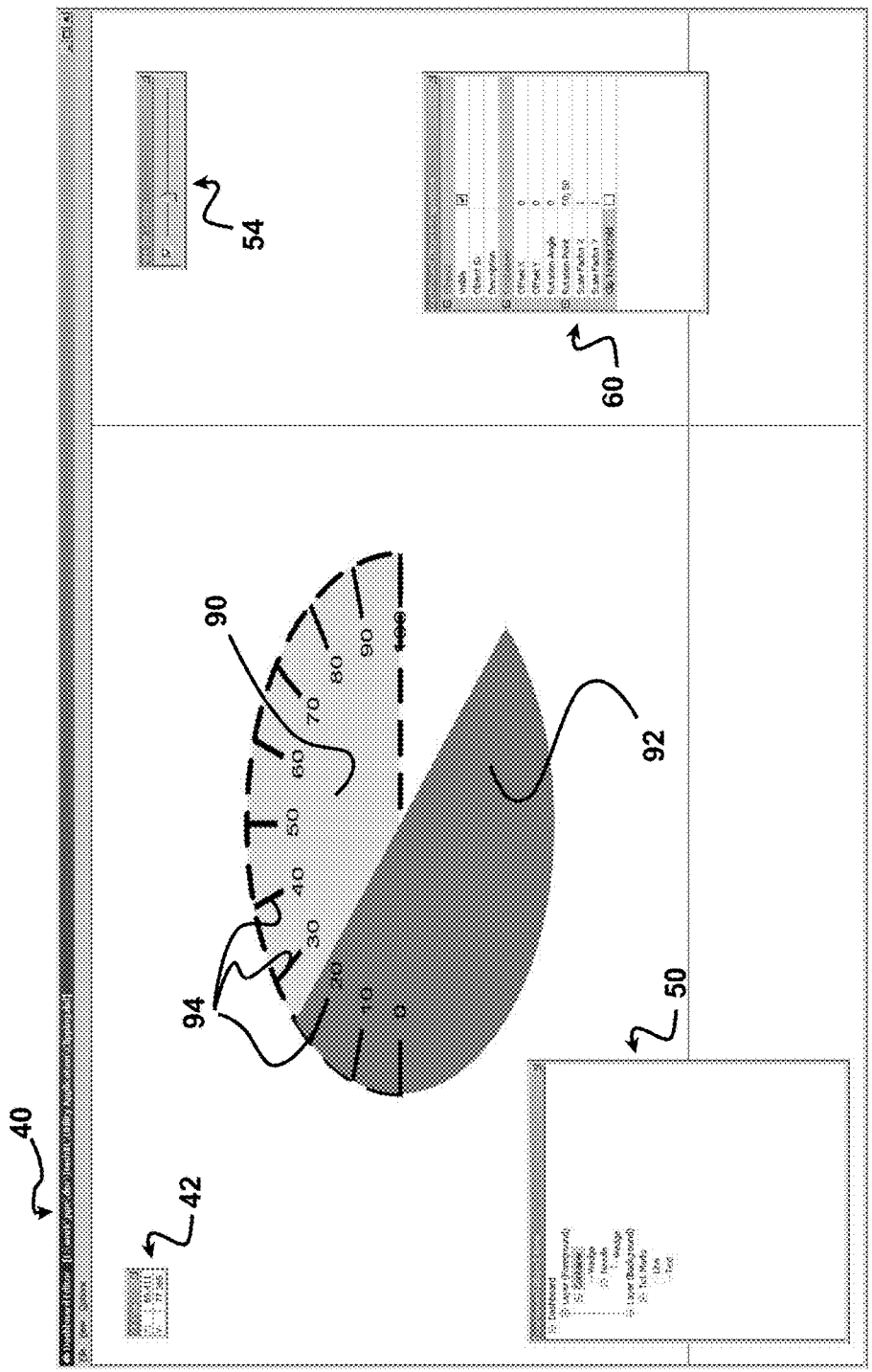
FIG. 12B depicts another step in the construction of a sample wedge gauge according to one embodiment of the present method.
Figure 12C:
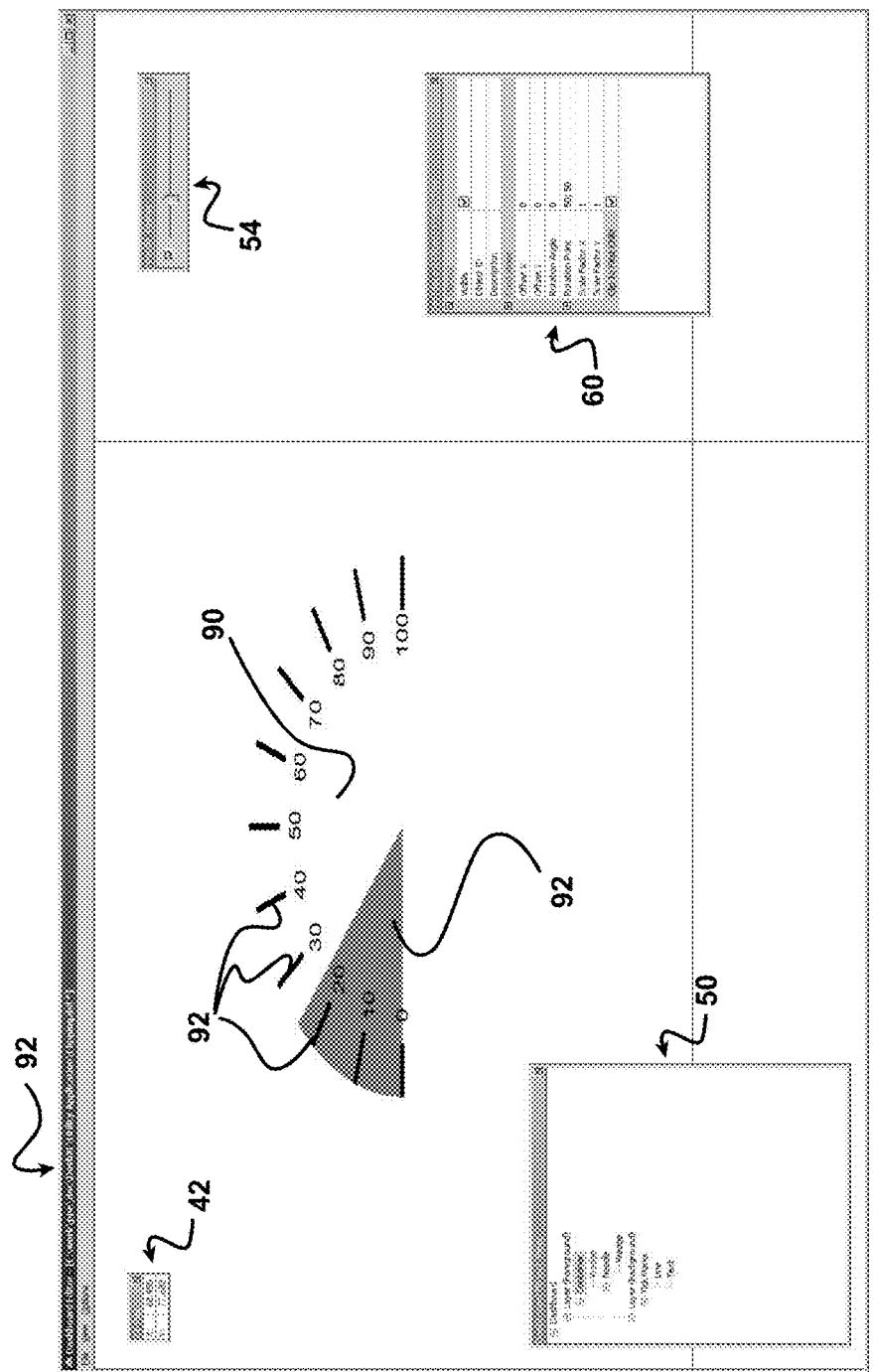
FIG. 12C depicts yet another step in the construction of a sample wedge gauge according to one embodiment of the present method.

As depicted in FIG. 12B, when the needle wedge 92 is activated, the entire wedge rotates clockwise, causing the straight line of the wedge to show a value against the tick marks 94. However, in the actual dashboard display, the gauge 88 will be clipped. Hence, the gauge in FIG. 12C depicts how the group of objects will appear when clipped. To change the object to which a child object is clipped, the user merely moves the desired object up in the dashboard object view window 50 to make it the first child in the container.

Figure 13A:
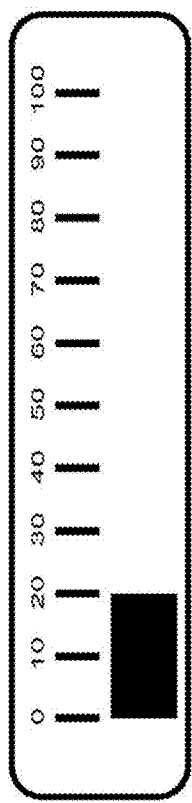
FIG. 13A depicts a step in the construction of a sample bar gauge according to one embodiment of the present method.
Figure 13B:
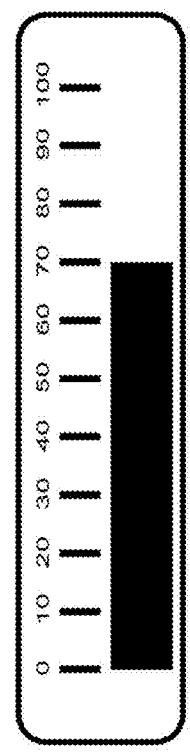
FIG. 13B depicts another step in the construction of a sample bar gauge according to one embodiment of the present method.

The user may also create linear needle gauges, see FIGS. 13A and 13B. To clip a child object (such as a rectangle) to a linear needle, the user sets the needle type (under linear needle) to clip, then selects a clip point as the place where clipping should start. In FIGS. 13A and 13B, the clip point is set to the same point as the zero tick mark of the gauge, but the user may clip from any point on the gauge. If the clip point were set at the 50 tick mark, the needle bar would appear to the right to indicate data values above 50 and to the left (of 50) for data values below 50.

On the dashboard page depicted in FIG. 11, a user deletes an object by clicking the right mouse button when the cursor is over the object and selecting delete from the drop-down menu. To add an object, a user right clicks on the container or layer under which the object is to be added and selects add objects. This displays objects that may be added. A user may add objects under any of the container objects (some of which may be a the dashboard object, a layer, a container, a needle, or a condition), and if added under an object, the added object is a child object to the parent object.

The user may order objects by right-clicking on an object and moving the object up or down on the object view list so that the object is contained below (a child of) a different (parent) object. Reordering and reorganizing objects allows one object to appear behind or in front of another object. The objects are ordered in the window from background to foreground. In other words, an object listed lower on the list is rendered on the computer 14 or other display in front of all objects listed above it (that is, all of its parent objects). To bring an object forward or send it backward, the user merely right-clicks the object and moves it up or down on the list. To move an object from one parent to another parent, copy and paste functions are also available by right-clicking the object.

Figure 14:
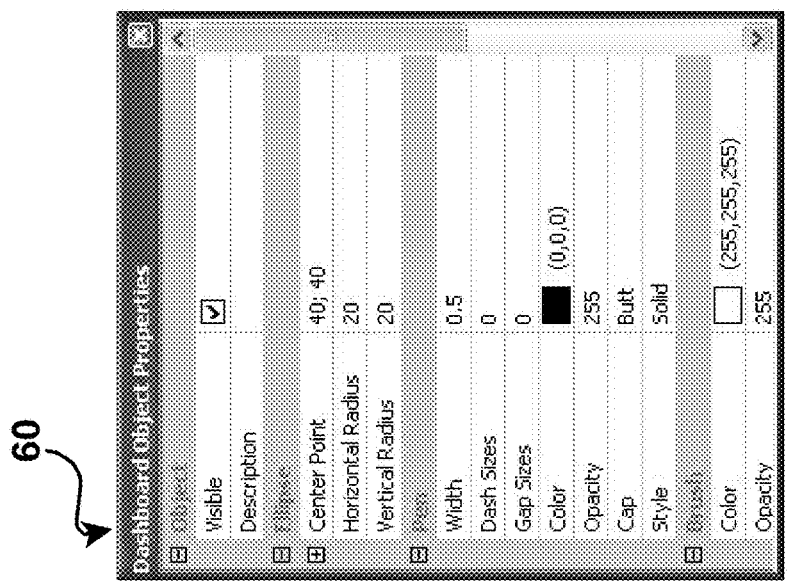
FIG. 14 depicts a close-up view of a dashboard object properties window according to one embodiment of the present method.

The user edits objects in the dashboard object properties window 60, see FIG. 14. The user selects an object in the dashboard object view window 50, see FIG. 16. When selected, all available customizable options for the object appear in the dashboard object properties window. In the embodiment depicted, each type of object has changeable properties, such as visibility, description, center point, horizontal radius, vertical radius, width, dash sizes, and other properties. The user may make the object visible by checking the visible box. A brief description of the object may be included in a description box. Lists may be extended and closed by clicking the + or − next to the lists.

FIGS. 15A, 15B, 15C, 15D, 15E, and 15F depict various exemplary gauges in accordance with one embodiment of the system. These examples are a fill gauge, fill gauge-bar, ellipse gauge, path gauge, condition gauge, and offset bar gauge. Each has its own set of properties, but the object properties for each shape may also be entered by a user for a shape the user has placed on a personalized dashboard. For instance, a user may incorporate a needle from one gauge, an ellipse from another gauge, tick marks from a third gauge, and include different shapes from other gauges into the new, personalized gauge. The user merely sets the center point for the objects so that the objects on the gauge line up.

FIG. 15A shows a typical fill gauge. Fill gauges include a wedge as a child of a container. The fill gauge properties include a specific horizontal radius, vertical radius, wedge angle, wedge sweep, and needle, as well as other properties. For example, the fill gauge depicted in FIG. 15A has the following object properties and values:

| Object | Properties |
|---|---|
| Container | Clip to first child box enabled |
| Wedge (child of container) | Horizontal Radius = 20 |
| | Vertical Radius = 20 |
| | Wedge Angle = 180 |
| | Wedge Sweep = 180 |
| Needle | Type = Circular |
| | Sweep = 180 |
| | Range = 0 to 100 |
| Wedge (child of needle) | Horizontal Radius = 20 |
| | Vertical Radius = 20 |
| | Wedge Angle = 0 |
| | Wedge Sweep = 180 |
| | Pen Style = Transparent |
| | Brush Color = (255, 0, 0) |
| | Brush Opacity = 128 |
| | Brush Style = Solid |
| Tick Marks | Type = Circular |
| | Tick Count = 11 |
| | Range = 0 to 100 |
| | Horizontal Radius = 20 |
| | Vertical Radius = 20 |
| | Angle = 185 |
| | Sweep = 170 |
| Line | (Default Options) |
| Text | (Default Options) |

FIG. 15B shows a typical bar fill gauge. Bar fill gauges include a gradient as the fill (under the needle). The 3 rounded rectangles at the top of the layer make up the 3-dimensional frame. The line at the bottom of the layer is the line in the middle of the gauge connects the tick marks together. The user may clip from the middle of the gauge to create a different effect on this fill gauge. The bar fill gauge depicted in FIG. 15B has the following object properties and values:

| Object | Properties |
|---|---|
| Rounded Rectangle | Size = 60; 20 |
| | Radius = 5 |
| | Pen = Transparent |
| | Brush Style = Gradient |
| | Gradient Style = Linear |
| | Gradient points = (pick first point just above and on the left of the rectangle; pick second point just below and on the right of the rectangle) |
| | Gradient Color Stops = |
| | [0, (255, 255, 255,), 255] |
| | [100, (0, 0, 0,), 255] |
| Rounded Rectangle | Size = 57; 16 |
| | Radius = 4 |
| | Pen = Transparent |
| | Brush Style = Gradient |
| | Gradient Style = Linear |
| | Gradient points = (pick first point just below and on the right of the rectangle; pick second point just above and on the left of the rectangle) |
| | Gradient Color Stops = |
| | [0, (255, 255, 255,), 255] |
| | [100, (0, 0, 0,), 255] |
| Rounded Rectangle | Size = 54; 11 |
| | Radius = 2 |
| | Pen = Transparent |
| Tick Marks | Type = Straight |
| | Tick Count = 11 |
| | Start and end points (under straight ticks) = (pick start point at left side of inner rectangle and end point at right side of inner rectangle) |
| | Length (under straight ticks) = 3 |
| | Label position (under straight ticks) = 4.5 |

-continued

| Object | Properties |
|---|---|
| Line | (Default Options) |
| Text | (Default Options) |
| Needle | Type = Linear |
|  | Type (under Linear Needle) = Clip |
|  | Start and end points = (pick start point at left side of inner rectangle and end point at right side of inner rectangle) |
|  | Clip Point = (same as start point above) |
| Rectangle | Center Point = (halfway between the bottom of the tick marks and the edge of the inner rectangle) |
|  | Size = 50; 4 |
|  | Pen = Transparent |
|  | Brush Style = Gradient |
|  | Gradient Style = Linear |
|  | Gradient Points = (Point 1 at bottom left edge of tick marks, point 2 at bottom right edge of tick marks) |
|  | Gradient Color Stops = |
|  | [0, (0, 128, 0), 255] |
|  | [50, (203, 208, 2), 255] |
|  | [75, (248, 152, 7), 255] |
|  | [100, (255, 0, 0), 255] |
| Line | Start and End Points = (Starting at bottom left edge of tick marks and ending at bottom right edge of tick marks) |
|  | Width = .25 |

FIG. 15C shows a typical ellipse gauge. The gauge depicted in FIG. 15C uses two layers. Most of the objects that do not change are on the background layer, while the objects that change are on a separate layer, to improve rendering speed. The top three ellipses 96a, 96b and 96c form the gauge frame, generating a 3-dimensional effect using gradients. Two separate tick mark objects are used, one for the longer tick marks with labels and one for the shorter tick marks without. The text in the background layer (the first layer) is "RPM×1000." The changing text, which shows the gauge's value, is in the second layer. A fourth ellipse 96d covers the end of the needle at the center of the gauge. Although this ellipse does not change, it is in this layer so that it could cover part of the needle in this layer. The ellipse gauge depicted in FIG. 15C has the following object properties and values:

| Object | Properties |
|---|---|
| Ellipse | Horizontal Radius = 19 |
|  | Vertical Radius = 19 |
|  | Pen Style = Transparent |
|  | Brush Style = Gradient |
|  | Gradient Style = Linear |
|  | Gradient Points = (Choose point one as the bottom right edge of the gauge and point two as the top left edge) |
|  | Gradient Color Stops = |
|  | [0, (0, 0, 0), 255] |
|  | [100, (255, 255, 255), 255] |
| Ellipse | Horizontal Radius = 17 |
|  | Vertical Radius = 17 |
|  | Pen Style = Transparent |
|  | Brush Style = Gradient |
|  | Gradient Style = Linear |
|  | Gradient Points = (Choose point one as the top left edge of the gauge and point two as the bottom right edge) |
|  | Gradient Color Stops = |
|  | [0, (0, 0, 0), 255] |
|  | [100, (255, 255, 255), 255] |
| Ellipse | Horizontal Radius = 16 |
|  | Vertical Radius = 16 |
|  | Pen Style = Transparent |
| Arc | Horizontal Radius = 15.5 |
|  | Vertical Radius = 15.5 |
|  | Arc Angle = 337 |
|  | Arc Sweep = 68 |
|  | Pen Style = Transparent |

-continued

| Object | Properties |
|---|---|
|  | Brush Style = Gradient |
|  | Gradient Style = Linear |
|  | Gradient Points = (Choose point one as the top of the arc and point two as the bottom of the arc) |
|  | Gradient Color Stops = |
|  | [0, (255, 0, 0), 65] |
|  | [100, (255, 0, 0), 255] |
| Tick Marks | Type = Circular |
|  | Tick Count = 9 |
|  | Label Start-End Range = 0-8 |
|  | Horizontal Radius = 16 |
|  | Vertical Radius = 16 |
|  | Angle = 135 |
|  | Sweep = 270 |
|  | Length = 15 |
|  | Label Position = 22 |
| Line | (Default Options) |
| Text | (Default Options) |
| Tick Marks | Type = Circular |
|  | Tick Count = 25 |
|  | Horizontal Radius = 16 |
|  | Vertical Radius = 16 |
|  | Angle = 135 |
|  | Sweep = 270 |
|  | Length = 8 |
| Line | Width = 0.07 |
| Text | (Default Options) |
| Text | Position = (Click on where the center of string should be) |
|  | Format String = RPM × 1000 |
|  | Value Type = Title (String) |
|  | Height = 1 |
|  | Width = 1 |
| Rounded Rectangle | Center Point = (Below the center point of text string "RPM × 1000") |
|  | Size = 8; 3 |
|  | Radius = 1 |
|  | Pen Width = 0.5 |
|  | Pen Color = (11 = 2, 112, 112) |
|  | Brush Style = Gradient |
|  | Gradient Style = Linear |
|  | Gradient Points = (For point one, select the right side of the rectangle. For point two, select the left side.) |
|  | Gradient Color Stops = |
|  | [0, (0, 0, 0), 255] |
|  | [100, (255, 255, 255), 255] |
| Text | Position = (Choose the center point of rounded rectangle) |
|  | Format String = %.0f |
|  | Use OBD-II Value box checked |
|  | PID = SAE.RPM |
|  | Value Type = Value (Number) |
|  | Value System = English |
|  | Height = 1 |
|  | Width = 1.5 |
|  | Brush Color = (128, 255, 128) |
| Needle | Type = Circular |
|  | Centerpoint = (Choose the center of the gauge) |
|  | Sweep = 270 |
|  | Range Start = 0 |
|  | Range End = 100 |
|  | PID = SAE.RPM |
|  | Value Type = Value (Number) |
|  | Value System = English |
| Line | Start Point = (Use same coordinates as needle centerpoint) |
|  | End Point = (Use outer edge of first tick mark) |
|  | Width = 1, 0.8, 0.5, 0.2, 0 |
|  | Pen Width = 0.1 |
|  | Pen Color = (112, 112, 112) |
|  | Brush Color = (234, 23, 0) |
|  | Brush Opacity = 128 |
| Ellipse | Center Point = (Use same coordinates as line start point) |
|  | Horizontal Radius = 1 |
|  | Vertical Radius = 1 |
|  | Pen Style = Transparent |
|  | Brush Style = Gradient |
|  | Gradient Style = Radial |
|  | Gradient Point 1 = (Use ellipse center point) |
|  | Gradient Point 2 = (Pick point just below ellipse) |

| Object | Properties |
|---|---|
| | Gradient Radius 1 = 1 |
| | Gradient Radius 2 = 1 |
| | Gradient Color Stops = |
| | [50, (192, 192, 192), 255] |
| | [100, (0, 0, 0), 255] |

Figure 16:
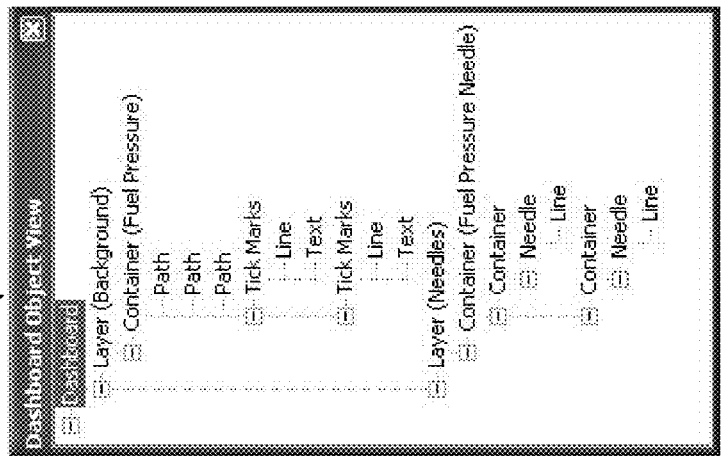
FIG. 16 depicts a close-up view of a dashboard object view window according to one embodiment of the present method.

FIG. 15D shows a typical path gauge. The gauge depicted in FIG. 15D illustrates using a path object as the shape of a gauge. The three paths combine to form a 3-dimensional frame. Another feature of this example is the larger tick marks. Instead of lines, these tick marks are drawn by triangles by using a width list in the line object below the tick marks. There is also a needle "shadow" on this gauge. This is done by offsetting the container with the needle. The first needle container gives the properties for this. The Dashboard Object View window of FIG. 16 shows an example of grouping objects by layers and containers. Many are also labeled. The path gauge depicted in FIG. 15D has the following object properties and values:

| Object | Properties |
|---|---|
| Container | (Default Options) |
| Path | Path = |
| | move_to(35, 35); |
| | curve_to(35, 10, 65, 10, 65, 35); |
| | curve_to(65, 37.5, 62.5, 37.5, 60, 37.25); |
| | line_to(52.5, 36.75); |
| | curve_to(51, 38.5, 49, 38.5, 47.5, 36.75); |
| | line_to(40, 37.25); |
| | curve_to(37.5, 37.5, 35, 37.5, 35, 35); |
| | close_path( ); |
| | Pen Style = Transparent |
| | Brush Color = (206, 205, 202) |
| | Brush Style = Gradient |
| | Gradient Style = Linear |
| | Gradient Points = (Set point one at top right edge; set point two at bottom left corner) |
| | Gradient Color Stops = |
| | [100, (136, 136, 136), 255] |
| Path | Path = |
| | move_to(35.75, 35); |
| | curve_to(35.75, 11.25, 64.25, 11.25, 64.25, 35); |
| | curve_to(64.25, 36.75, 61.75, 36.5, 59.25, 36.5); |
| | line_to(52.5, 35.9); |
| | curve_to(50.75, 37.75, 49.25, 37.75, 47.5, 35.9); |
| | line_to(40, 36.5); |
| | curve_to(38.25, 36.75, 35.75, 36.5, 35.75, 35); |
| | close_path( ); |
| | Pen Style = Transparent |
| | Brush Color = (135, 135, 135) |
| | Brush Style = Gradient |
| | Gradient Style = Linear |
| | Gradient Points = (Set point one at top right edge; set point two at bottom left corner) |
| | Gradient Color Stops = |
| | [100, (199, 199, 199), 255] |
| Path | Path = |
| | move_to(36, 35); |
| | curve_to(35.75, 11.75, 64.25, 11.75, 64, 35); |
| | curve_to(64, 36.5, 61.5, 36.25, 59, 36.25); |
| | line_to(52.25, 35.65); |
| | curve_to(50.75, 37.5, 49.25, 37.5, 47.75, 35.65); |
| | line_to(40, 36.25); |
| | curve_to(38.5, 36.5, 36, 36.25, 36, 35); |
| | close_path( ); |
| | Pen Style = Transparent |
| | Brush Color = (154, 154, 154) |
| | Brush Style = Gradient |
| | Gradient Style = Linear |
| | Gradient Points = (Set point one at top right edge; set point two at bottom left corner) |

| Object | Properties |
|---|---|
| Tick Marks | Gradient Color Stops = |
| | [100, (69, 69, 69), 255] |
| | Type = Circular |
| | Tick Count = 5 |
| | Label Start/End Range = 0/100 |
| | Label Start Rotation = 270 |
| | Label End Rotation = 450 |
| | Center Point = (Center horizontally, towards bottom of gauge) |
| | Horizontal Radius = 12 |
| | Vertical Radius = 12 |
| | Angle = 180 |
| | Sweep = 180 |
| | Length = 13 |
| | Label Position = 22 |
| Line | Width = 0.6, 0.3 |
| | Pen Width = 0.1 |
| | Pen Color = (98, 98, 98) |
| | Brush Color = (205, 205, 205) |
| Text | (Default Options) |
| Tick Marks | Type = Circular |
| | Tick Count = 29 |
| | Skip Tick List = 0, 7, 14, 21, 28 |
| | Show Tick Labels Box = Unchecked |
| | Label Start/End Range = 0/10 |
| | Label Start Rotation = 270 |
| | Label End Rotation = 450 |
| | Center Point = (Center horizontally, towards bottom of gauge) |
| | Horizontal Radius = 11.75 |
| | Vertical Radius = 11.75 |
| | Angle = 180 |
| | Sweep = 180 |
| | Length = 10 |
| | Label Position = 22 |
| Line | Width = 0.25 |
| | Pen Width = 0.1 |
| | Pen Color = (98, 98, 98) |
| | Brush Color = (205, 205, 205) |
| Text | (Default Options) |
| Container | (Default Options) |
| Container | Offset X = 0.5 |
| | Offset Y = 0.5 |
| Needle | Type = Circular |
| | Center Point = (Same as tick marks) |
| | Sweep = 180 |
| | Range Start/End = (As tick marks specify) |
| | PID = SAE.FRP |
| | Value Type = Value (Number) |
| Line | Start Point = (Same as needle center point) |
| | End Point = (Inner edge of first tick mark) |
| | Width = 0.7, 1, 0.01 |
| | Brush Opacity = 80 |
| Container | (Default Options) |
| Needle | Type = Circular |
| | Center Point = (Same as tick marks) |
| | Sweep = 180 |
| | Range Start/End = (As tick marks specify) |
| | PID = SAE.FRP |
| | Value Type = Value (Number) |
| Line | Start Point = (Same as needle center point) |
| | End Point = (Inner edge of first tick mark) |
| | Width = 0.7, 1, 0.01 |
| | Brush Color = (200, 0, 0) |

Figure 15F:
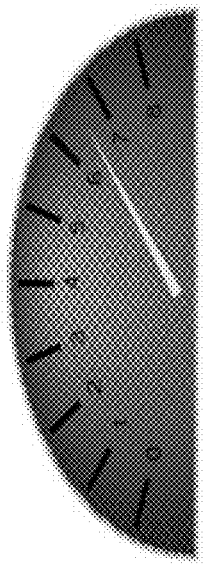
FIG. 15F depicts a second view of a sample condition gauge constructed according to one embodiment of the present method.
Figure 15E:
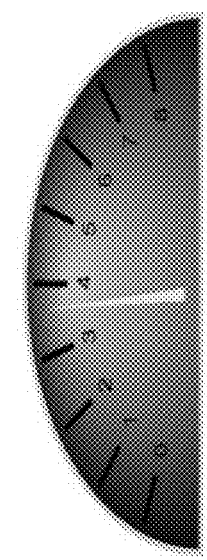
FIG. 15E depicts a first view of a sample condition gauge constructed according to one embodiment of the present method.

FIGS. 15E and 15F show a typical condition gauge as an example of a condition object used on a gauge. In this condition, if the gauge reads over 6, the background turns hatched, as demonstrated by FIG. 15F. Another way to use a condition is inside a needle object, so that if the value matches the condition the needle changes color or images. The condition gauge depicted in FIGS. 15E and 15F has the following object properties and values:

| Object | Properties |
|---|---|
| Wedge | Wedge Sweep = 180 |
| | Pen Width = 0.5 |
| | Pen Color = (231, 225, 1) |
| | Brush Style = Gradient |
| | Gradient Style = Radial |
| | Gradient Points = (Pick point one in center horizontally and at the bottom of the center tick mark and point two in the center horizontally and at the bottom of the wedge) |
| | Gradient Radius 1 = 1 |
| | Gradient Radius 2 = 20 |
| | Gradient Color Stops = |
| | [100, (0, 0, 0), 255] |
| | [0, (192, 192, 192), 255] |
| Condition | (All under Condition One) |
| | Operator = Less Than Or Equal |
| | Value = 6000 |
| | PID = SAE.RPM |
| | Value Type = Value (Number) |
| | Unit System = English |
| Container (True) | (Default Options) |
| Container (False) | (Default Options) |
| Wedge | Wedge Sweep = 180 |
| | Pen Style = Transparent |
| | Brush Style = Hatch |
| | Hatch Style = Sphere |
| | Hatch Scale = 0.5 |
| Needle | Type = Circular |
| | Center Point = (Bottom center of gauge) |
| | Sweep = 180 |
| | PID = SAE.RPM |
| | Value Type = Value (Number) |
| | Unit System = English |
| Line | Start Point = (Same as needle center point) |
| | End Point = (Below middle of first tick mark) |
| | Width = 1, 0.5, 0 |
| | Brush Color = (254, 248, 1) |
| Tick Marks | Type = Circular |
| | Tick Count = 9 |
| | Label Start-End Range = 0-8 |
| | Horizontal Radius = 19 |
| | Vertical Radius = 19 |
| | Angle = 200 |
| | Sweep = 140 |
| | Length = 20 |
| Line | (Default Options) |
| Text | (Default Options) |

Figure 15G:
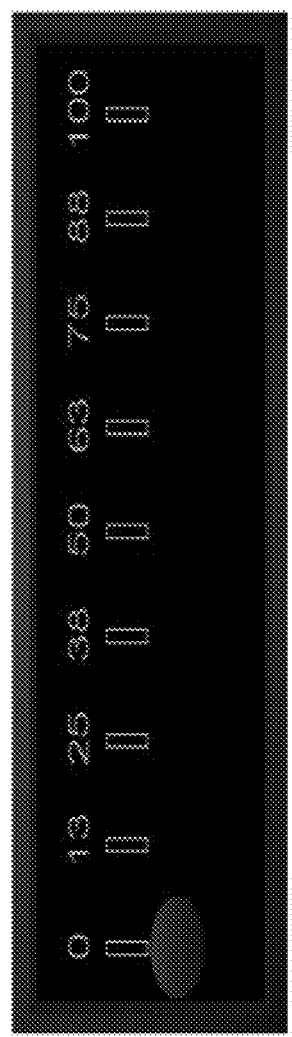
FIG. 15G depicts a sample offset bar gauge constructed according to one embodiment of the present method.

FIG. 15G shows a typical offset bar gauge with the offset needle option. The ellipse is the needle object child that marks the value horizontally along the gauge. Two rectangles form a three-dimensional frame. The offset bar gauge depicted in FIG. 15G has the following object properties and values:

| Object | Properties |
|---|---|
| Rectangle | Size = 40; 20 |
| | Pen = Transparent |
| | Brush Color = (0, 128, 0) |
| | Brush Style = Gradient |
| | Gradient Style = Radial |
| | Gradient points = (pick first point horizontally centered and at the top of the rectangle; pick first point horizontally centered and above the rectangle) |
| | Gradient Radius 1 = 1 |
| | Gradient Radius 2 = 40 |
| | Gradient Color Stops = |
| | [100, (0, 0, 0,), 255] |
| Rectangle | Size = 38; 17 |
| | Pen Color = (0, 43, 0) |
| | Brush Color = (0, 0, 0) |
| Tick Marks | Type = Straight |
| | Tick Count = 9 |
| | Start and end points (under straight ticks) = (pick start point vertically centered at left side of inner rectangle and end point vertically centered at right side of inner rectangle) |
| | Length (under straight ticks) = 3 |
| | Label position (under straight ticks) = 5 |
| Line | Pen Width = 0.1 |
| | Pen Color = (0, 255, 0) |
| | Brush Color = (0, 0, 0) |
| Text | Brush Color = (0, 255, 0) |
| Needle | Type = Linear |
| | Type (under Linear Needle) = Offset |
| | Start and end points = (pick start point at left side of inner rectangle and end point at right side of inner rectangle) |
| Ellipse | Center Point = (Same as start point for needle) |
| | Horizontal Radius = 2 |
| | Vertical Radius = 2 |
| | Pen = Transparent |
| | Brush Color = (255, 0, 0) |
| | Brush Style = Gradient |
| | Gradient Style = Linear |
| | Gradient Points = (Point 1 horizontally centered above the ellipse and Point 2 horizontally centered below the ellipse) |
| | Gradient Color Stops = |
| | [100, (0, 0, 0), 128] |

The present method allows a user more effectively to design and display vehicle telemetry data on a computer monitor or display. Thus, the present invention has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A vehicle telemetry data dashboard and display system having a graphical display device that is configured to be in electrical communication with a vehicle data port capable of providing vehicle telemetry data to the system, the system comprising:
   one or more display dashboards comprising dashboard objects, which dashboard objects can be stored, organized, or accessed as a group, list or tree hierarchy;
   each dashboard object being positioned within a display dashboard based on a coordinate system;
   each dashboard object having one or more properties, the properties including at least one of an arbitrary shape, color, attribute, operating parameter, data item, vehicle telemetry value, picture, clipping region, or visual image;
   each dashboard object having a display state, the display state being at least one of a hidden state and a shown or visible state;
   at least one dashboard object being capable of overlapping at least one other dashboard object; and
   in which at least one dashboard object is rendered on the graphical display device;
   wherein a vehicle telemetry datum obtained from the vehicle data port is applied to at least one property of at least one dashboard object, thereby causing a transformation of the at least one property;

wherein applying a single vehicle telemetry datum may cause a plurality of differing transformations to a plurality of properties from a plurality of dashboard objects; and wherein the transformation of a first property may cause a transformation of a second property.

2. The system of claim 1 wherein the transformation of the second property is associated with the first property by inclusion of the second property in a group, list or tree hierarchy that also contains the first property.

3. The system of claim 1 wherein the graphical display device utilizes a rendering cache to speed up subsequent renderings of dashboard objects.

4. The system of claim 3 wherein certain dashboard objects identify if any properties have been transformed since the previous rendering and either use a cached rendering or create a new rendering.

5. The system of claim 1 wherein the coordinate system is scalable to fit multiple display resolutions.

6. The system of claim 1 wherein the coordinate system positions a first dashboard object based in part on where the coordinate system positions a second dashboard object.

7. The system of claim 1 wherein the system transforms at least one property of a first dashboard object based in part on how the system transforms a property of a second dashboard object.

8. The system of claim 1 wherein property transformations are constrained by configurable limits or settings.

9. The system of claim 1 wherein a first dashboard object or property can automatically generate additional dashboard objects and properties based on user configurable limits, settings, events, data items, or vehicle telemetry data values.

10. The system of claim 1 wherein at least one dashboard object can be configured to respond to user input.

11. The system of claim 1 wherein property transformation involves at least one of scaling, rotation, translation, offsetting, clipping, color changes, state changes, picture changes, and text changes.

12. The system of claim 1 wherein properties can be dynamically transformed based on user input or a change in user configurable limits, settings, or events.

13. The system of claim 1 wherein at least one dashboard object can be configured to obscure, overlap, or clip portions of itself or other dashboard objects based on user configurable limits, settings, or events.

14. The system of claim 1 wherein at least one dashboard object has a type, the type being at least one of a dashboard, a layer, a container, a pen, a brush, an ellipse, a rectangle, a rounded rectangle, a line, a polygon, a picture, an arc, a pie wedge, a path, a tick mark, a text, a needle, a curve, a condition, a gauge, a graph, a bar, a label, a button, and a font.

15. The system of claim 1 wherein dashboards can constrain rendering to a specific aspect ratio regardless of physical display size or resolution.

16. The system of claim 1 wherein one dashboard object can be rendered multiple times with varying properties.

17. The system of claim 1 wherein the system is capable of transforming one or more properties from one or more dashboard objects as a set.

18. The system of claim 1 wherein a single display dashboard contains more than one separate and distinct group, list, or tree hierarchy of dashboard objects.

19. The system of claim 18 wherein a single dashboard object belongs to more than one separate and distinct group, list, or tree hierarchy.

20. The system of claim 1 wherein the dashboard objects can be graphical, rendered, descriptive, organizational, structural, or generic objects.

21. The system of claim 1 wherein more than one display dashboard may be simultaneously displayed on the graphical display device.

22. The system of claim 1 wherein the system is capable of switching between a plurality of display dashboards being displayed on the graphical display device.

* * * * *